(12) United States Patent
Porat

(10) Patent No.: US 9,758,301 B2
(45) Date of Patent: Sep. 12, 2017

(54) SYSTEM AND METHOD FOR OVERHEAD WAREHOUSING

(71) Applicant: Joseph Porat, Highland Beach, FL (US)

(72) Inventor: Joseph Porat, Highland Beach, FL (US)

( * ) Notice: Subject to any disclaimer, the term of this patent is extended or adjusted under 35 U.S.C. 154(b) by 0 days.

(21) Appl. No.: 15/461,756

(22) Filed: Mar. 17, 2017

(65) Prior Publication Data

US 2017/0190510 A1 Jul. 6, 2017

Related U.S. Application Data

(63) Continuation-in-part of application No. 15/076,995, filed on Mar. 22, 2016, now Pat. No. 9,617,075.

(60) Provisional application No. 62/137,483, filed on Mar. 24, 2015.

(51) Int. Cl.

| | |
|---|---|
| *B65G 1/06* | (2006.01) |
| *B65G 1/04* | (2006.01) |
| *B65G 1/137* | (2006.01) |
| *G05D 1/00* | (2006.01) |
| *G05D 1/10* | (2006.01) |
| *B60L 11/18* | (2006.01) |
| *B64C 39/02* | (2006.01) |
| *B64D 1/22* | (2006.01) |

(52) U.S. Cl.
CPC ............ *B65G 1/06* (2013.01); *B60L 11/1861* (2013.01); *B64C 39/024* (2013.01); *B64D 1/22* (2013.01); *B65G 1/0464* (2013.01); *B65G 1/1378* (2013.01); *G05D 1/0011* (2013.01); *G05D 1/101* (2013.01); *B60L 2200/10* (2013.01); *B64C 2201/066* (2013.01); *B64C 2201/128* (2013.01); *B64C 2201/146* (2013.01)

(58) Field of Classification Search
CPC ................................. B65G 1/0464; B65G 1/06
See application file for complete search history.

(56) References Cited

U.S. PATENT DOCUMENTS

| | | | |
|---|---|---|---|
| 6,898,484 B2 * | 5/2005 | Lemelson | G05B 19/19 318/568.1 |
| 9,465,994 B1 * | 10/2016 | Mishra | H04N 5/77 |
| 9,519,882 B2 * | 12/2016 | Galluzzo | B25J 5/007 |

(Continued)

*Primary Examiner* — Thomas Randazzo
(74) *Attorney, Agent, or Firm* — Glenn E. Gold, P.A.; Glenn E. Gold; David Colls

(57) ABSTRACT

An overhead warehousing system for use in a warehouse having a ceiling and storage racks supported by the floor of a warehouse includes drawers configured to contain parcels at designated locations of individual cells in the storage racks and adapted to be opened and closed, flight corridors defined along the storage racks adjacent to the individual cells, drones having gripper heads translatable relative to opened drawers to retrieve parcels therefrom, and a communication subsystem communicating with the drones to control their flying on the flight trajectories along the flight corridors and between a designated docking station, selected ones of designated parcel retrieval locations and selected ones of designated parcel drop locations and also communicating with the drones to control their gripper heads relative to opened drawers and communicating with individual cells for opening and closing drawers as drones approach and depart the selected individual cells.

20 Claims, 20 Drawing Sheets

(56) References Cited

U.S. PATENT DOCUMENTS

| | | | | |
|---|---|---|---|---|
| 9,540,121 | B2* | 1/2017 | Byers | B64C 39/024 |
| 9,565,400 | B1* | 2/2017 | Curlander | H04N 7/181 |
| 2007/0201969 | A1* | 8/2007 | Dye | B65G 1/06 |
| | | | | 414/266 |
| 2007/0226088 | A1* | 9/2007 | Miles | G06Q 10/08 |
| | | | | 705/28 |
| 2010/0247275 | A1* | 9/2010 | Karlen | B65D 88/022 |
| | | | | 414/286 |
| 2014/0017052 | A1* | 1/2014 | Honkanen | B65G 1/0421 |
| | | | | 414/626 |
| 2016/0090248 | A1* | 3/2016 | Worsley | B65G 67/08 |
| | | | | 414/398 |
| 2016/0247115 | A1* | 8/2016 | Pons | G06Q 10/087 |
| 2017/0039607 | A1* | 2/2017 | Stiernagle | G07F 9/023 |
| 2017/0046654 | A1* | 2/2017 | Evers | G06Q 10/087 |

* cited by examiner

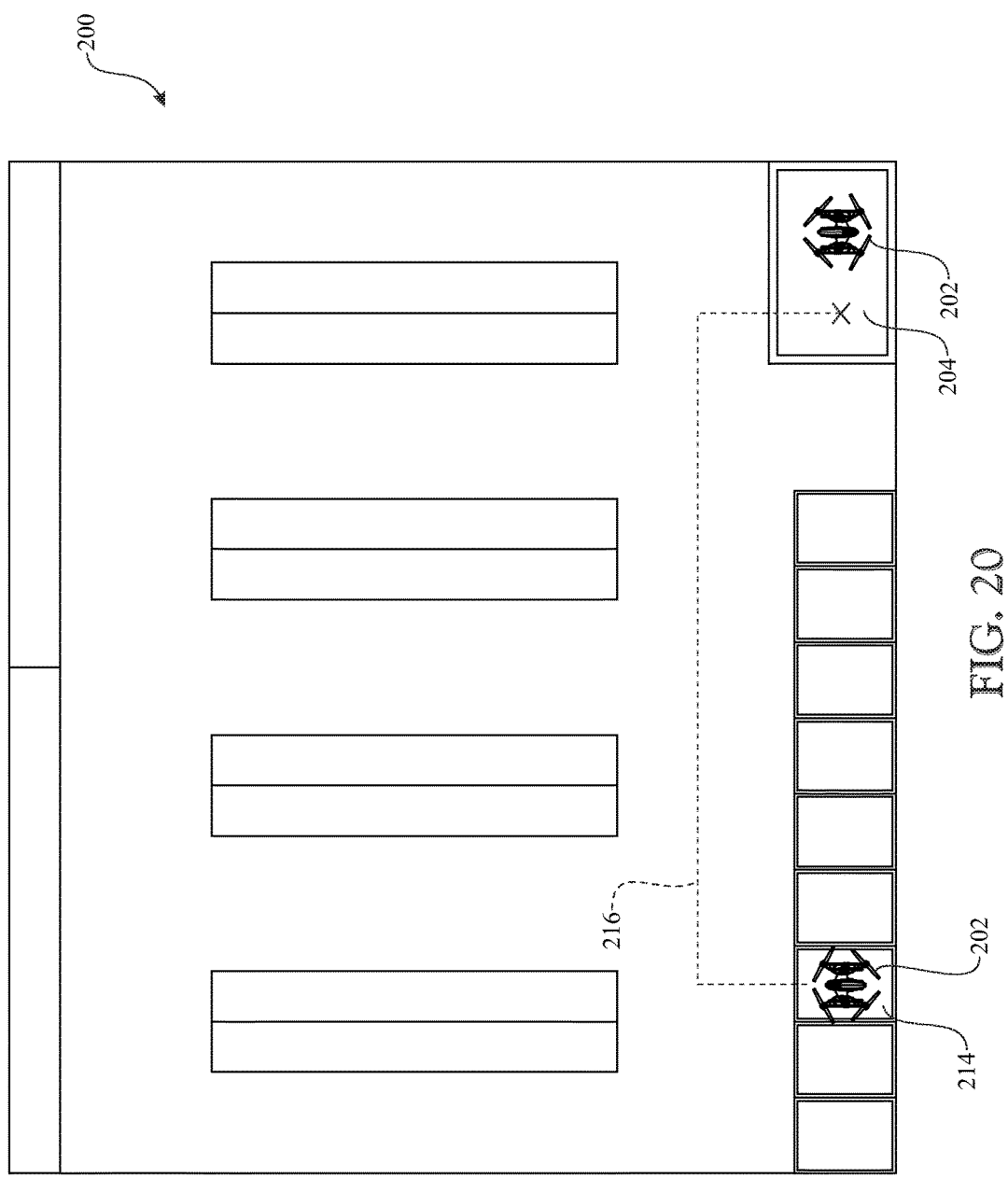

SYSTEM AND METHOD FOR OVERHEAD WAREHOUSING

CROSS REFERENCE(S) TO RELATED APPLICATION(S)

This U.S. non-provisional patent application is a continuation-in-part of parent U.S. non-provisional patent application Ser. No. 15/076,995, filed Mar. 22, 2016, which, in turn, claims the benefit of U.S. provisional patent application No. 62/137,483, filed Mar. 24, 2015, all of which are hereby incorporated-by-reference herein in their entireties.

FIELD OF THE INVENTION

The present disclosure generally relates generally to apparatuses and methods for automated warehousing. More particularly, the present disclosure relates to an automated warehousing system, which is suspended from the roof or ceiling of a warehouse, as opposed to a conventional floor-based system.

BACKGROUND OF THE INVENTION

Automation in general is the use of various control systems for operating equipment such as machinery, processes in factories, telephone network switching, etc., with minimal or reduced human intervention. Some processes have even been completely automated and result in a significant reduction of human labor, energy and materials, while improving quality, accuracy and precision. While the seeds of automation were planted at the beginning of the Industrial Revolution, true automation has increasingly become more dominant in recent decades, concurrently with the integration of computer processing to provide the desired precision control.

As industries grew in size and scope, so too did the need to for increased space for storage of products manufactured by the various producers in the industries. The increased demand for products requires increasingly greater areas for storage of those products during the time period between production and distribution, or between different distribution stages. Consequently, large dedicated buildings, conventionally referred to as "warehouses," were constructed for such storage. To facilitate efficient storage and retrieval of the items, accurate data must be maintained relative to the quantity and placement of items in the warehouse so that the items can be retrieved with minimal searching and on an as-needed basis. Prior to automation, when an item needed to be retrieved, a worker would receive a request for an item, research the storage location, travel to the location and pick up the desired quantity, and then return to the point of origin for further distribution. As the cost of labor increased, such labor intensive methods for the storage and retrieval of warehoused items became cost prohibitive and warehousing readily lent itself to adopt forms of automation to keep such costs in control.

Traditional warehousing has declined since the last decades of the 20$^{th}$ century, with the gradual introduction of improved efficiencies such as "just-in-time" delivery techniques. The just-in-time system promotes product delivery directly from suppliers to the consumer without the use of warehouses. However, with the growth of a global economy, international shipment of goods over significantly large distances still necessitates a certain amount of warehousing. Additionally, recent retailing trends have led to the development of warehouse-style retail stores, also known as big-box stores. These high ceiling buildings display retail goods on tall, heavy-duty industrial racks, rather than on conventional retail shelving. Typically, items ready for sale are on the bottom of the racks and palletized inventory is stored on the upper racks. When the palletized inventory is required to be accessed, a forklift is utilized to remove the pallets from the upper racks for display on the lower racks. As such, the storage and retrieval system is floor based, or ground based, wherein the equipment utilized to move the product is supported by, and travels across, the floor.

Large warehouses utilizing automated storage and retrieval systems also rely upon floor or ground based equipment for the movement of warehoused product within the warehouse. Such systems include warehousing concepts such as a pallet shuttle, wherein a forklift sets a load atop a pallet shuttle which then moves along a track in the storage rack to deposit the load in the correct location. The use of a pallet shuttle system has the advantage of being high density and semi-automatic. A movable rack system incorporates racks which are laterally movable on a designated set of linear tracks such that the racks can be laterally translated to create an aisle for a forklift or other mechanism to retrieve inventory from a designated rack. This system also has the advantage of being high density and permits direct access to any pallet stored on the racks. Other systems incorporate automated stacker cranes to replace manned forklifts and can reach storage locations up to approximately fifty (50) feet in height. This system can be utilized for heavy pallets as well as for individual boxes, totes or trays.

However, the above-mentioned systems all utilize floor or ground based equipment, which is often height limited and thus often results in wasted, unused space at the upper reaches of the building. Accordingly, there is a clear need for an automated, accurate and efficient, warehousing system that is ceiling based to facilitate optimized maximum use of the building interior space.

SUMMARY OF THE INVENTION

The present disclosure is generally directed to an overhead warehousing system for use in a warehouse having a ceiling and a plurality of storage racks supported by the floor of a warehouse.

In one aspect of the present invention, an overhead warehousing system, for use in a warehouse having a ceiling and a plurality of storage racks supported by a floor of the warehouse, includes:

a plurality of drawers each configured to contain a parcel, each drawer being positioned at a designated parcel retrieval location of one of a plurality of individual cells in each of the plurality of storage racks and adapted to be opened and closed relative to the one individual cell;

a plurality of flight corridors defined along the storage racks adjacent to the plurality of individual cells;

at least one drone having a gripper head translatable relative to an opened one of the drawers at the designated parcel retrieval location of the respective one individual cell for retrieving a parcel from the opened one of the drawers; and a communication subsystem in communication with the at least one drone for plotting a flight trajectory for the at least one drone and controlling flying of the drone on the flight trajectory along at least one of the flight corridors and between a designated docking station, a selected one of designated parcel retrieval locations and a selected one of designated parcel drop locations, the communication subsystem also in communication with the at least one drone for controlling translation of the gripper head relative to the opened one of the drawers and with the individual cells for opening and closing the drawer of a selected one of the individual cells as the at least one drone approaches and departs the selected one individual cell.

In another aspect of the present invention, the communication subsystem is also in communication with the at least one drone for monitoring a battery of the drone and instructing the drone to fly to a recharging station when the battery reaches a predetermined percentage of remaining life of the battery.

In another aspect of the present invention, an overhead warehousing system, for use in a warehouse having a ceiling and a plurality of storage racks supported by a floor of the warehouse, includes:

a plurality of drawers each configured to contain a parcel, each drawer being positioned at a designated parcel retrieval location of one of a plurality of individual cells in each of the plurality of storage racks and adapted to be opened and closed relative to the one individual cell;

a plurality of flight corridors defined along the storage racks adjacent to the plurality of individual cells;

a plurality of drones each having a gripper head translatable relative to an opened one of the drawers at the designated parcel retrieval location of the respective one individual cell for retrieving a parcel from the opened one of the drawers; and a communication subsystem in communication with the drones for plotting flight trajectories for the drones and controlling flying of the drones on the flight trajectories along the flight corridors so as to monitor locations of each of the drones to prevent collisions between the drones as they fly from and to a designated docking station and selected ones of designated parcel retrieval locations and selected ones of designated parcel drop locations, the communication subsystem also in communication with the drones for controlling translation of the gripper heads relative to the opened ones of the drawers and further in communication with the individual cells for opening and closing the drawers of selected ones of the individual cells as the drones approach and depart the selected ones of individual cells.

In another aspect of the present invention, the overhead warehousing method, for use in a warehouse having a ceiling and a plurality of storage racks supported by a floor of the warehouse, includes the steps of:

providing a plurality of drawers each configured to contain a parcel, with each drawer being positioned at a designated parcel retrieval location of one of a plurality of individual cells in each of the plurality of storage racks and adapted to be opened and closed relative to the one individual cell;

providing a plurality of flight corridors defined along the storage racks adjacent to the plurality of individual cells;

providing a plurality of drones each having a gripper head translatable relative to an opened one of the drawers at the designated parcel retrieval location of the respective one of the individual cells for retrieving a parcel from the opened one of the drawers;

communicating with the drones to plot flight trajectories for the drones;

communicating with the drones to control flying of the drones on the flight trajectories along the flight corridors and from and to a designated docking station and selected ones of designated parcel retrieval locations and selected ones of designated parcel drop locations;

communicating with the drones to control translation of gripper heads relative to opened ones of the drawers; and communicating with the individual cells to open and close drawers of selected ones of the individual cells as the drones approach and depart the selected ones of the individual cells.

In another aspect of the present invention, the method includes the step of communicating with the drones to monitor locations of each of the drones during flight to prevent collisions between the drones as they fly from and to a designated docking station and selected ones of designated parcel retrieval locations and selected ones of designated parcel drop locations.

In another aspect of the present invention, the method includes the step of communicating with the drones for monitoring a battery of each of the drones and instructing each drone to fly to a recharging station when the battery reaches a predetermined percentage of the remaining life of the battery.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 20 presents a top plan view of the system as shown in FIGS. 14 and 18, wherein now the drone is shown flying along a flight trajectory calculated as the most direct route from the designated drop location to the drone docking station.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
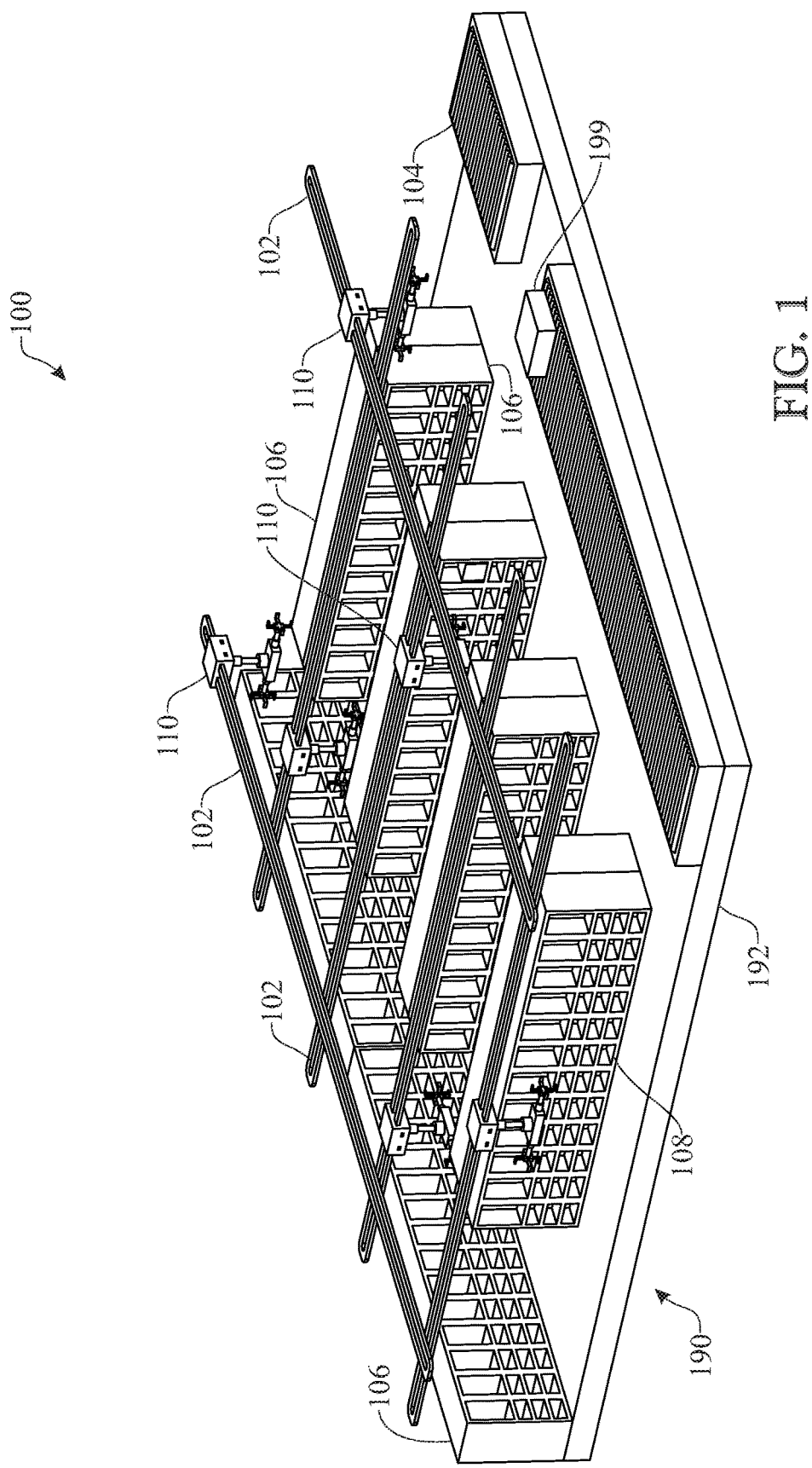
FIG. 1 presents an isometric view of an overhead warehousing system in accordance with an exemplary implementation, wherein the system includes a plurality of robotic modules translatable upon overhead tramways.

In one exemplary implementation of the invention, an overhead warehousing system 100 is shown in FIG. 1, illustrating its various components where a warehouse 190 has a floor 192 on which are supported a plurality of storage racks 106. Each storage rack 106 is divided into a plurality of individual cells 108. Although the various figures herein illustrate storage racks 106 having cells 108, 109 (of differing heights) separated one from the other by physical walls, those practiced in the art will readily recognize that each cell 108, 109 can be readily identified by unique physical coordinates without the need for physical walls separating one cell 108, 109 from an adjacent cell 108, 109.

As shown in FIG. 1 a plurality of tramways 102 are positioned above the storage racks 106 which are supported on floor 192 of the warehouse 190. Tramways 102, on which robotic modules 110 translate as shown in FIG. 1 and in the various figures throughout, are shown as rails. However, the tramways 102 can alternatively be comprised of an overhead rail, a cable, or other suitable track permitting the translation of robotic modules 110 thereon. The tramways 102 are affixed to or suspended from a ceiling (not shown for the sake of clarity) of the warehouse 190. Mounting of the warehousing system 100 to the warehouse ceiling, permits use of storage space up to the ceiling normally unavailable with floor-based warehousing systems, and thus increases product throughput without the financial investment for expensive floor space or additional warehousing. Those practiced in the art will readily recognize that the overhead warehousing system 100 as described herein can be combined with a traditional floor-based system to create a hybrid warehousing system. The addition of the overhead warehousing system 100 to an existing floor-based system thereby further optimizes use of available warehouse space. Currently, big-box retail stores typically use the upper levels of storage racks for bulk inventory storage and access them with floor-based mechanical systems such as forklifts. The overhead system 100 permits establishments to utilize the overhead system 100 for bulk storage in the upper rack areas, while continuing to use floor-based systems such as worker-driven forklifts to transport inventory to display areas at the lower consumer accessible areas. Each tramway 102 is positioned proximate to a storage rack 106 and has at least one robotic module 110 engaged thereon and can preferably accommodate a plurality of robotic modules 110.

Figure 5:
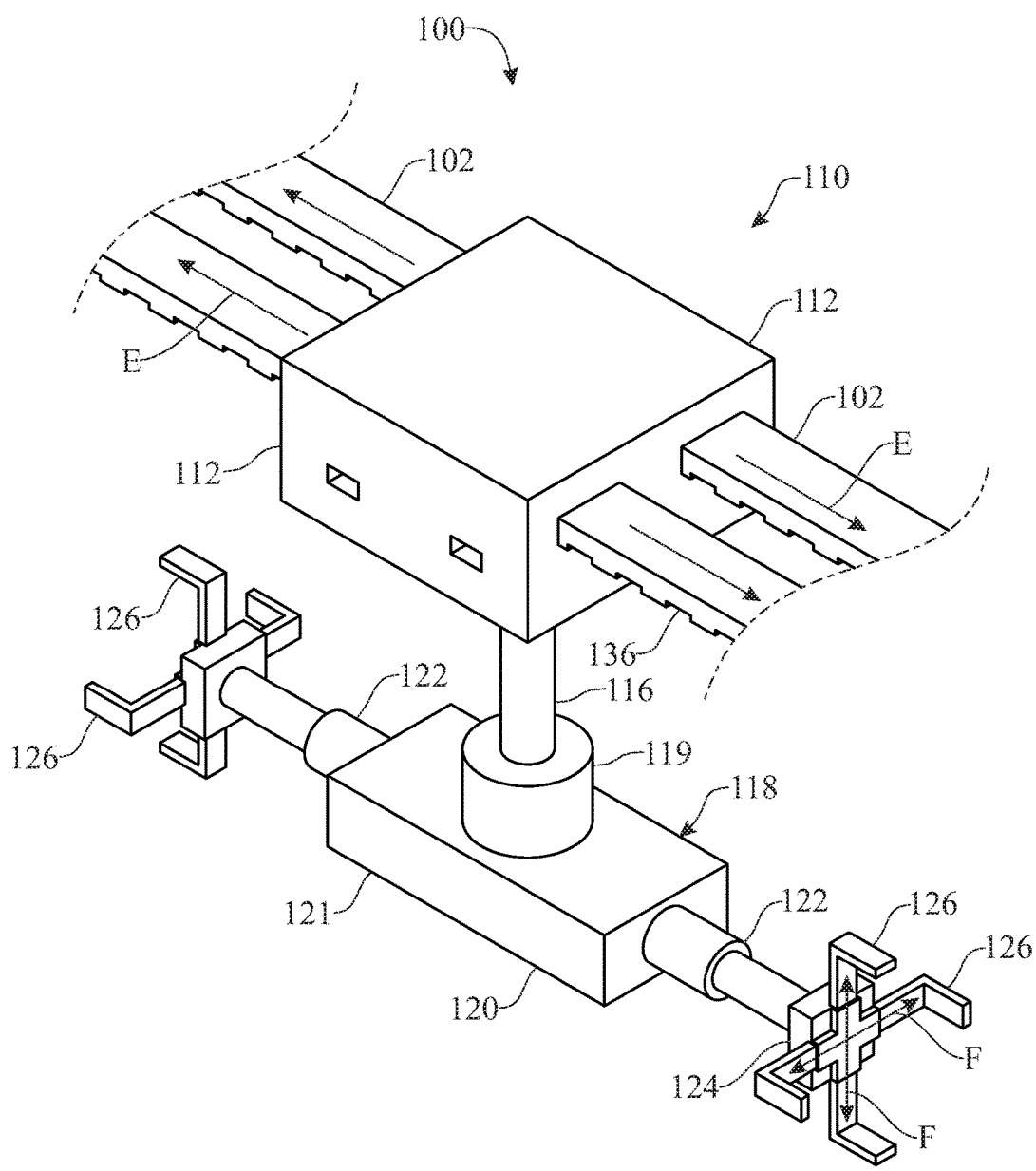
FIG. 5 presents an isometric view of the representative robotic module similar to that of FIG. 2 but now illustrated engaged upon the tramway.

As best illustrated in FIGS. 2-5 the robotic module 110 includes a powered carrier 112 having at least one tramway guide 114 for receiving a single track of the tramway 102 for translation therealong. As here illustrated in an exemplary embodiment, the powered carrier 112 includes positioning motors (not shown) and two spaced-apart tramway guides 114 each for receiving a correspondingly one of dual spaced-apart tracks of the tramway 102, with the positioning motors engaging the tracks of the tramway 102 for translation of the robotic module 110 therealong in accordance with arrow "E" (FIG. 5). The dual spaced-apart tracks of the tramway 102 provide stability for the robotic module 110. The powered carrier 112 can receive power via the dual tracks of the tramway 102, flexible wiring (not shown), or batteries (not shown), for example. Depending upon the implementation of the overhead warehousing system 100, provisions for power transfer to the robotic module and positioning motors therein can be provided by different modalities known in the art. If the robotic module 110 is battery operated, the overhead warehousing system 100 would also include provisions for taking the robotic module 110 off-line at a charging station (not shown). The system 100 may include a plurality of charging stations, and the selection of a charging station for a particular robotic module 110 requiring charging would be determined by the position of the robotic module 110, available power, and available workload.

The tramway 102 can include indexing points 136 at regular intervals therealong and the powered carrier 112 of each robotic module 110 can include a positioning encoder for sensing the individual indexing points 136 to accurately position itself on the tramway 102. The communications for placement is generated by the communication subsystem 160 (FIG. 12) and conducted to the powered carrier 112 via either hard wires 172 or by wireless signals 174. Each robotic module 110 has a unique identifier for individualized communication. Additionally, power for the various functions of the robotic module 110 can be transferred using mechanical connections and interfaces along the tramway 102.

Figure 2:
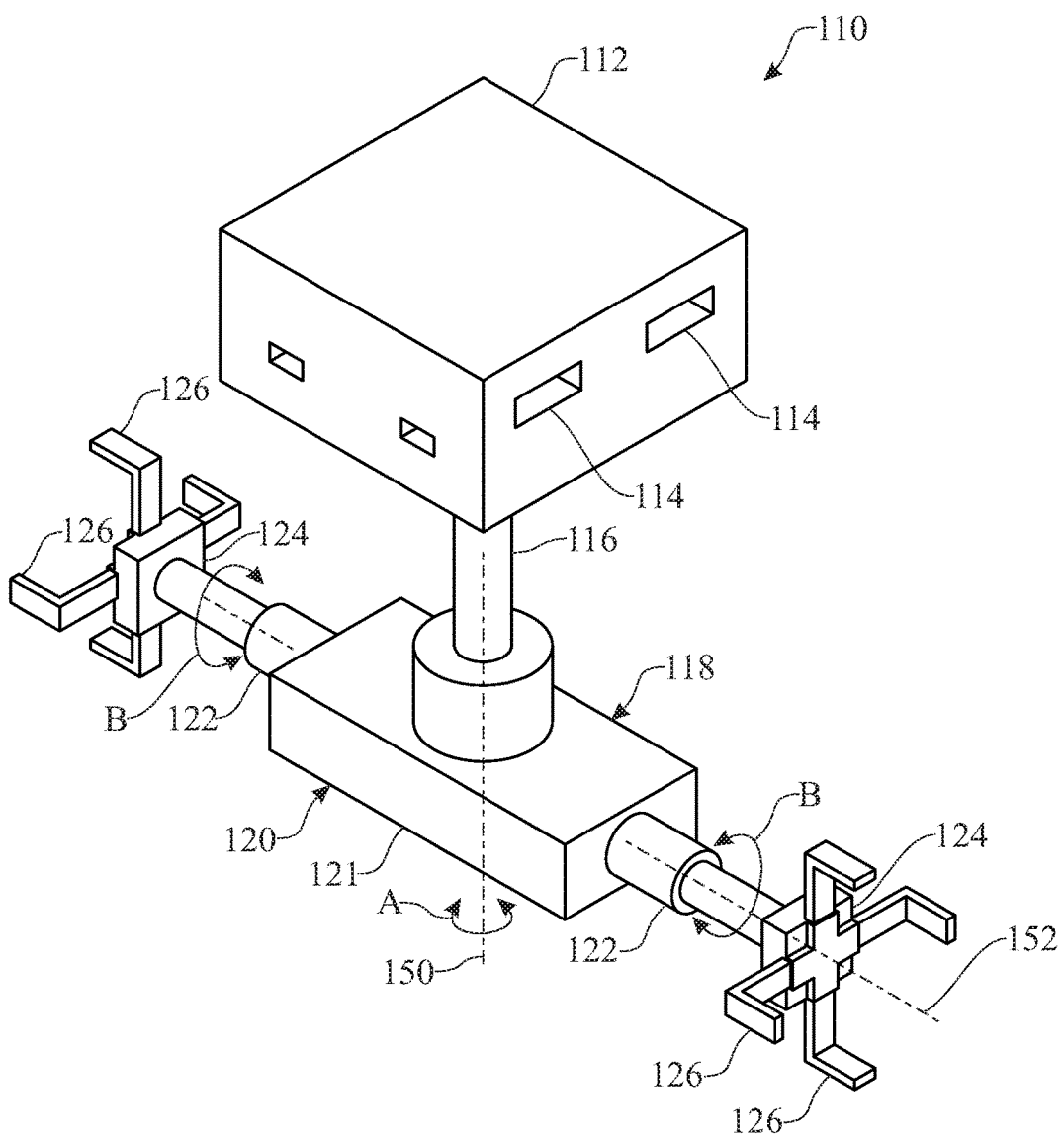
FIG. 2 presents an isometric view of a representative robotic module having a utility head for gripping one or more parcels.
Figure 3:
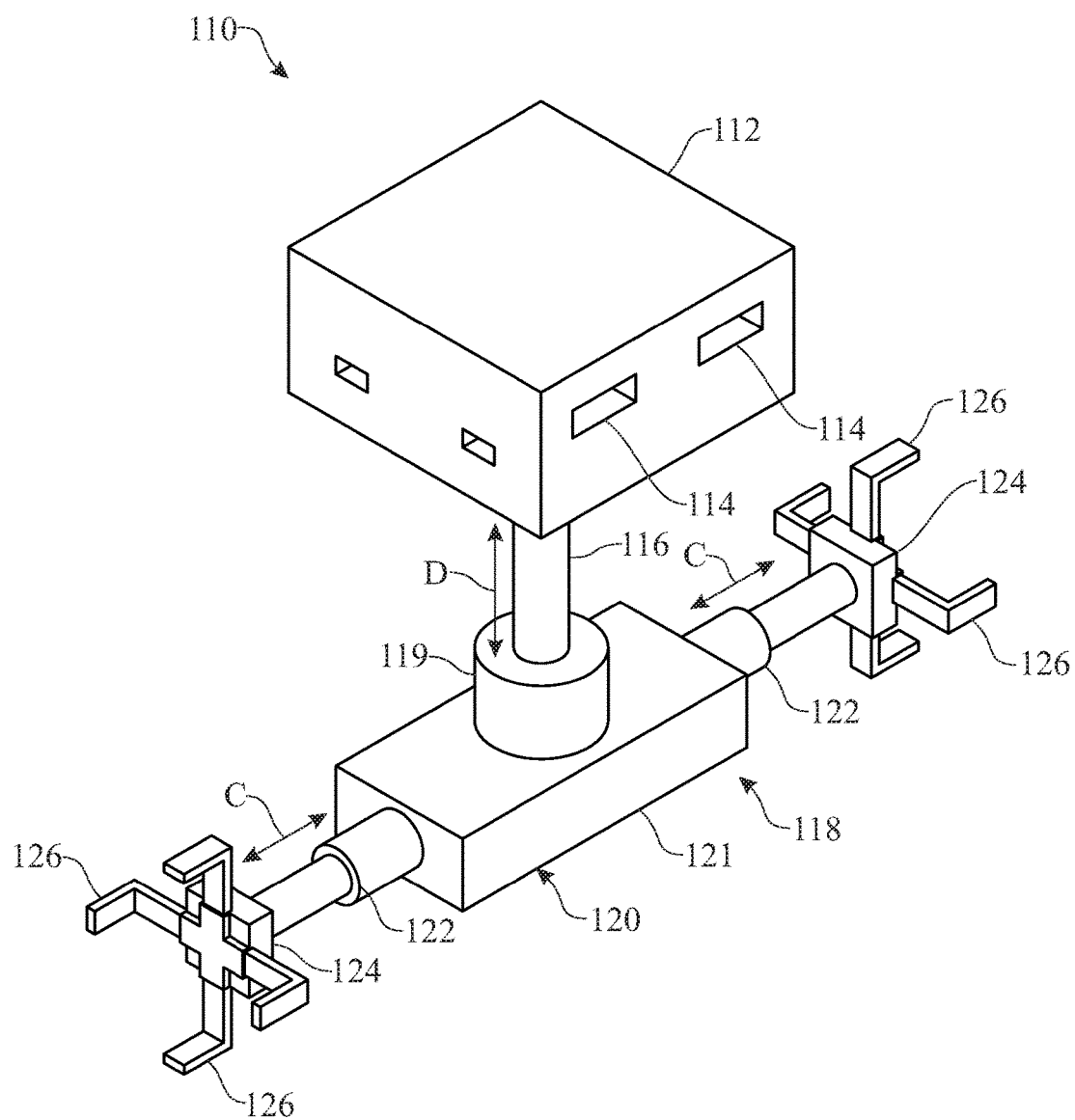
FIG. 3 presents an isometric view of the representative robotic module wherein the utility head for gripping one or more parcels is shown rotated 90 degrees.
Figure 4:
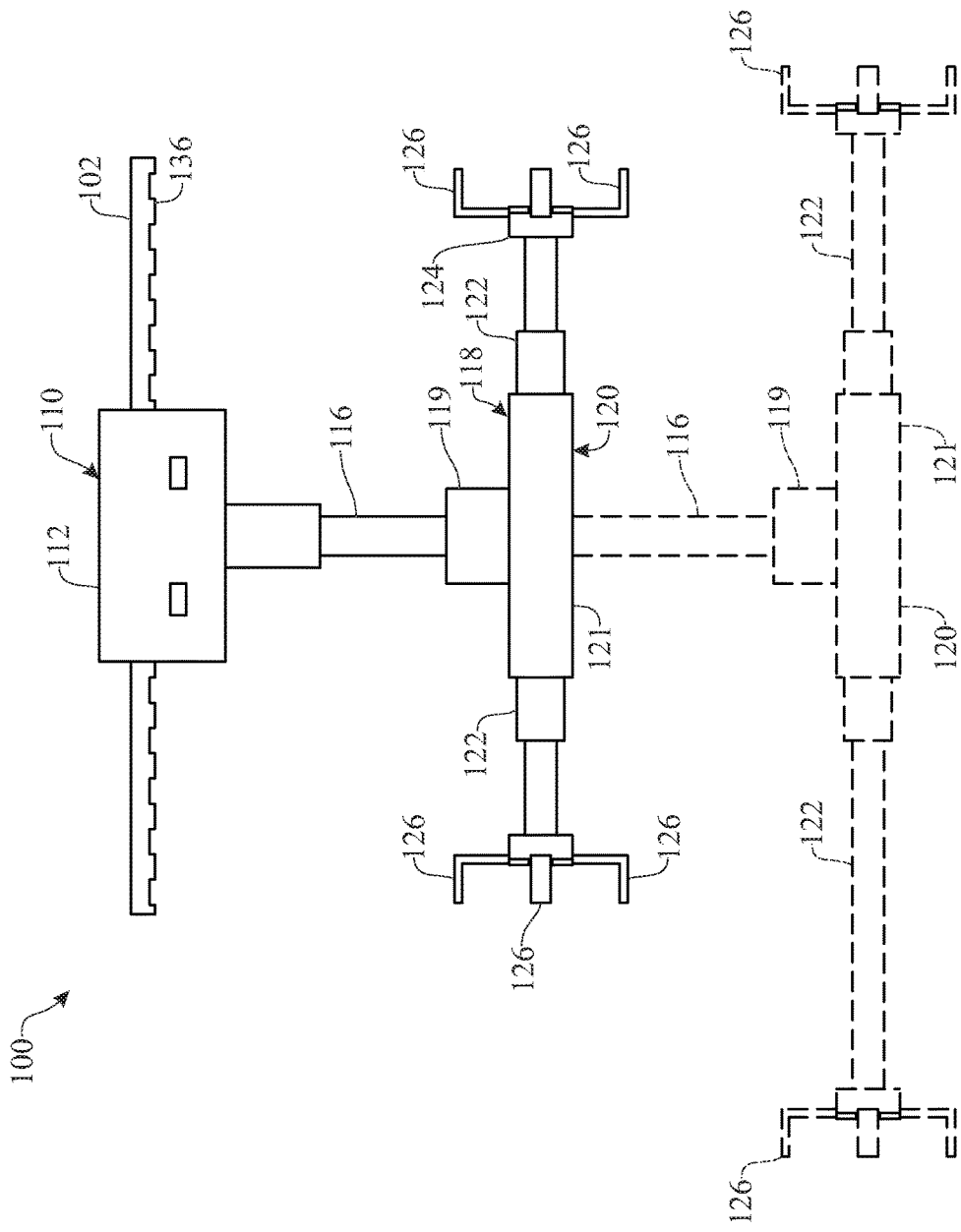
FIG. 4 presents a side elevational view of a representative robotic module engaged upon a tramway and illustrates the vertical and horizontal mobility of the utility head.

The powered carrier 112 also includes a vertical control 116 extending downwardly therefrom along a vertical axis 150 (FIG. 2). The vertical control 116 is vertically extendable in a powered manner along the axis 150, bi-directionally in accordance with arrow "D" (FIG. 3). Further, the powered control of the vertical control 116 also facilitates the rotation of the vertical control 116 about the vertical axis 150 in accordance with arrow "A" (FIG. 2).

The robotic module 110 also includes a selectively-interchangeable utility head 118 being detachably attached to the vertical control 116 utilizing a common mounting interface 119. The common mounting interface 119 permits the attachment of different devices including, but not limited to, a parcel carrier 120 for rectangular objects, a gripper for cylindrical objects, a gripper for custom-shaped objects, a camera, scanner, a weighing scale, a label or, a vacuum cleaner, a scrub brush, etc. The various figures herein representatively illustrate the attachment of a rectangular parcel carrier 120 attached to the vertical control 116 via the common mounting interface 119.

The rectangular parcel carrier 120 incorporates a gripper control 121 which includes the communications interface, motors and actuators (not shown) for the carriage, placement, and retrieval of a rectangular parcel 199 (FIGS. 6-10). A horizontal control actuator 122 is positioned at each of opposing ends of the gripper control 121. Those practiced in the art will recognize that the geometric configuration of the gripper control 121 can be modified to accommodate multiple horizontal control actuators 122 and gripper heads 124. Each horizontal control actuator 122 has a respective gripper head 124 attached to an end of the actuator 122 and facilitates angular rotation of the respective gripper head 124, in accordance with the directional arrows "B" (FIG. 2), and horizontal translation of the respective gripper head 124, in accordance with directional arrows "C" (FIG. 3). Each gripper head 124 includes a plurality of gripper fingers 126 which are selectively positionable by a powered mechanism (not shown) in the gripper head 124. The gripper fingers 126 can be extended to an open position to receive a parcel 199 therein and then retracted in accordance with directional arrows "F" (FIG. 5) to frictionally grasp the parcel 199 for movement within the warehouse 190. The parcel carrier 120 operably affixed to the powered carrier 112 can be used to pick parcels 199 for distribution or for placing parcels 199 into a designated cell location for future retrieval. The parcel carrier 120 can be used for stocking shelves or for retrieving parcels from shelves, and for removing or placing parcels on conveyors, sorters, boxes, pallets, crates, etc.

A station (not shown) is also provided for placing different utility heads 118 onto the vertical control actuator 116 utilizing the common mounting interface 119. This permits the use of a common powered carrier 112 to selectively attach or detach a specific utility head 118 such as parcel carrier 120, specialized grippers for various geometric shapes, cameras, scanners, scales, labelers, and cleaning apparatuses.

Figure 12:
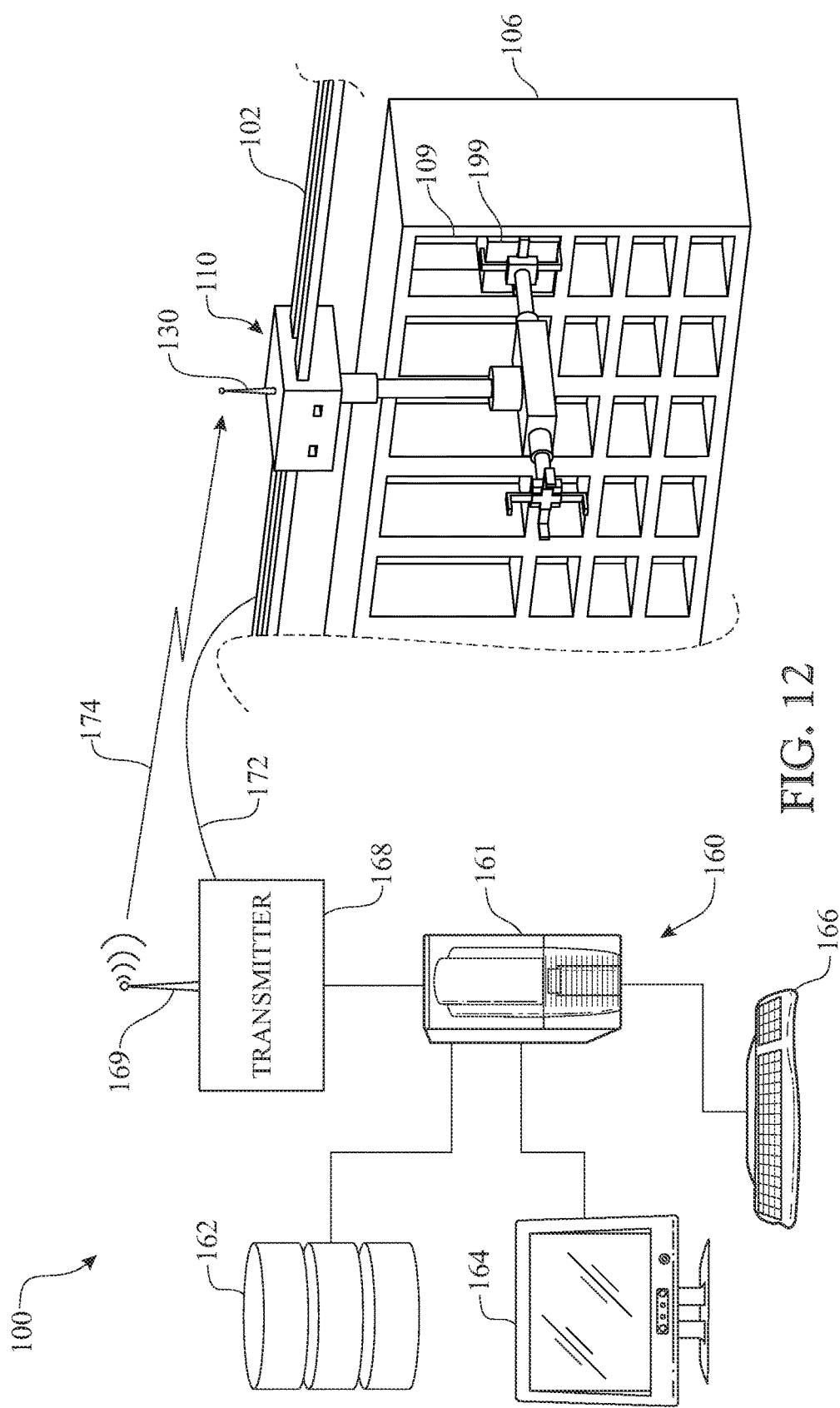
FIG. 12 presents a schematic diagram of an exemplary overhead warehousing system, including a computer control and communication subsystem.

Referring now to FIG. 12, the overhead warehousing system 100 can include a communication subsystem 160. The communication subsystem 160 includes a central processing unit (CPU) 161 which executes an instruction set stored on a memory module 162 for conducting the warehousing protocol. The memory module 162 further includes a database of locations of individual cells 108, of which cells 108 are unoccupied, and which cells are occupied by specified parcels 199. The CPU 161 may also be connected to a user input device 166, such as a keyboard, and to a display 164 to facilitate interactive control by a user. The CPU 161 is also connected to a communication transmitter which can be communicatively connected to the various robotic modules 110 via a hardwired communication line 172 or by wireless signal transmission 174 from antenna 169. The robotic module 110, in turn, can have an antenna 130 for receiving the wireless signal transmission 174 or, alternatively, can receive the control signals from hardware 172 via the tramway 102.

Figure 6:
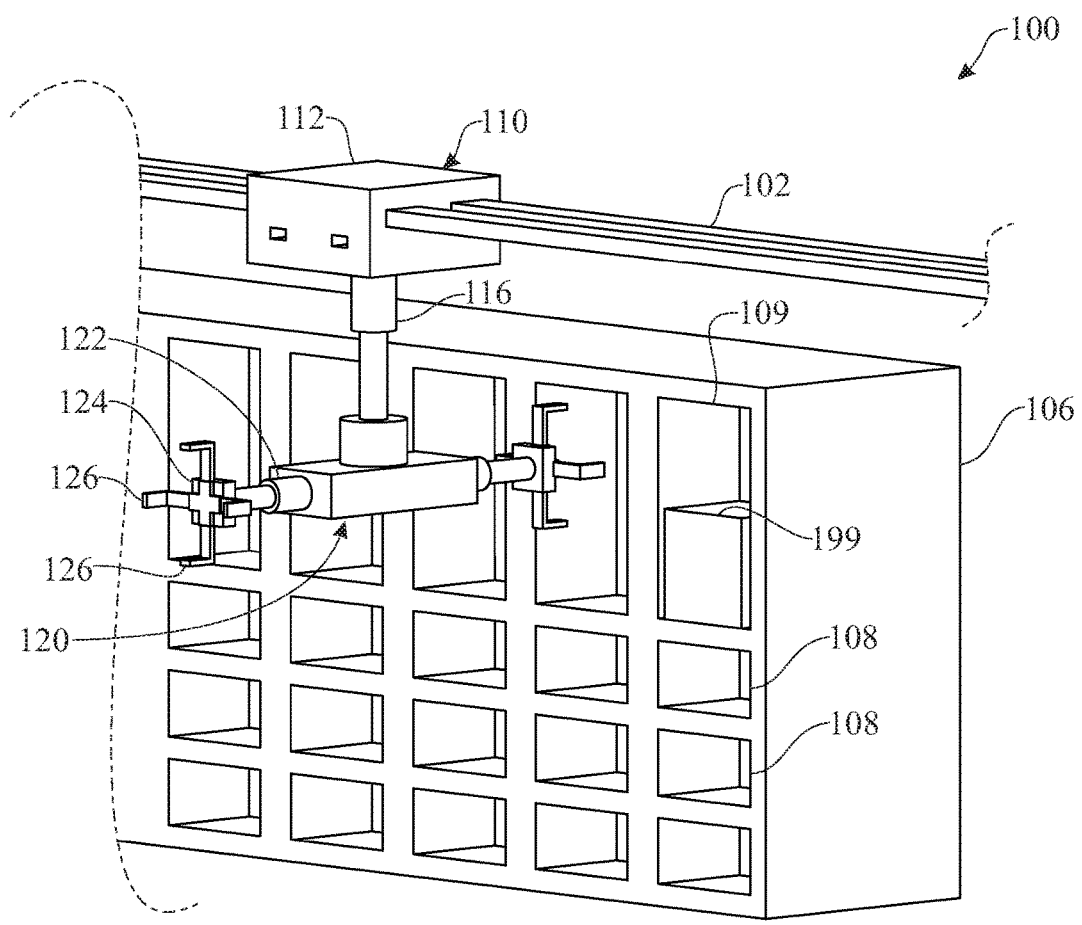
FIG. 6 presents an isometric view of a robotic module approaching a designated cell containing a parcel to be retrieved from a storage rack.
Figure 7:
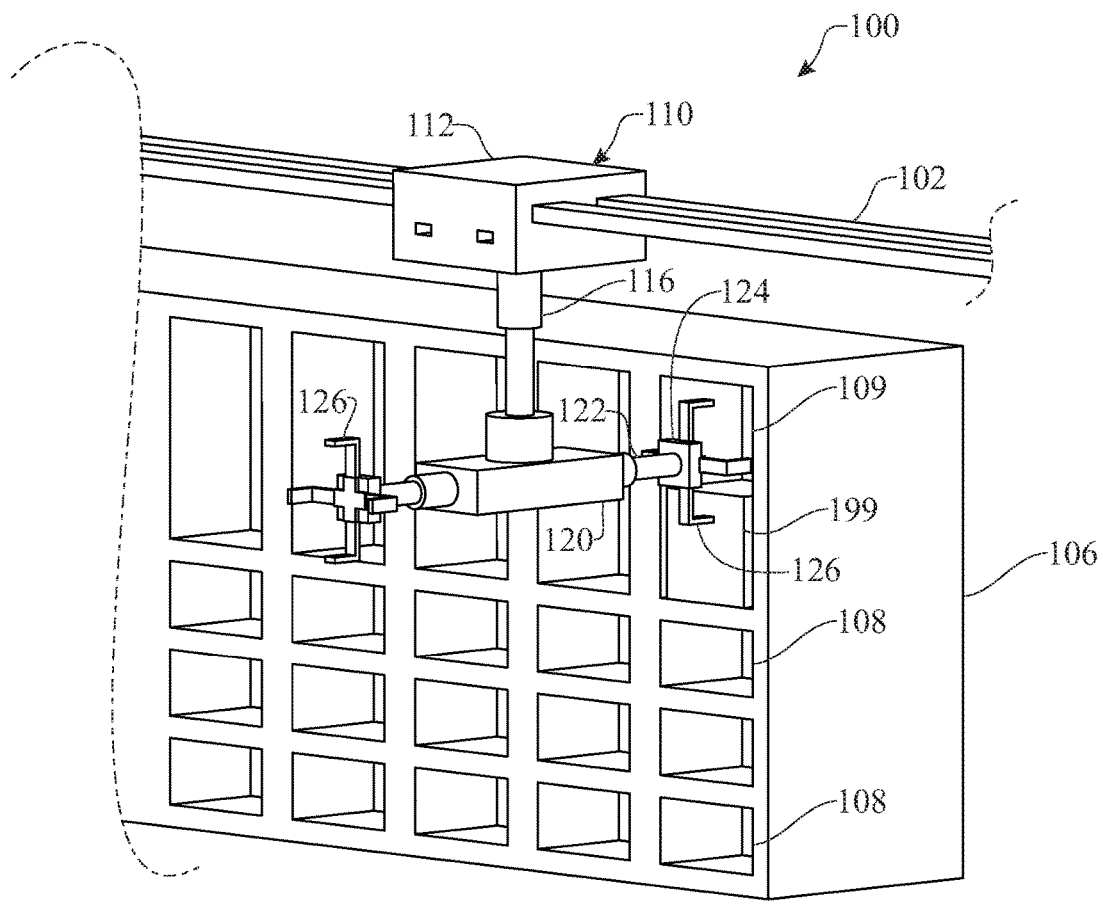
FIG. 7 presents an isometric view of the robotic module having its utility head horizontally aligned with the individual cell station for retrieval of the parcel.
Figure 8:
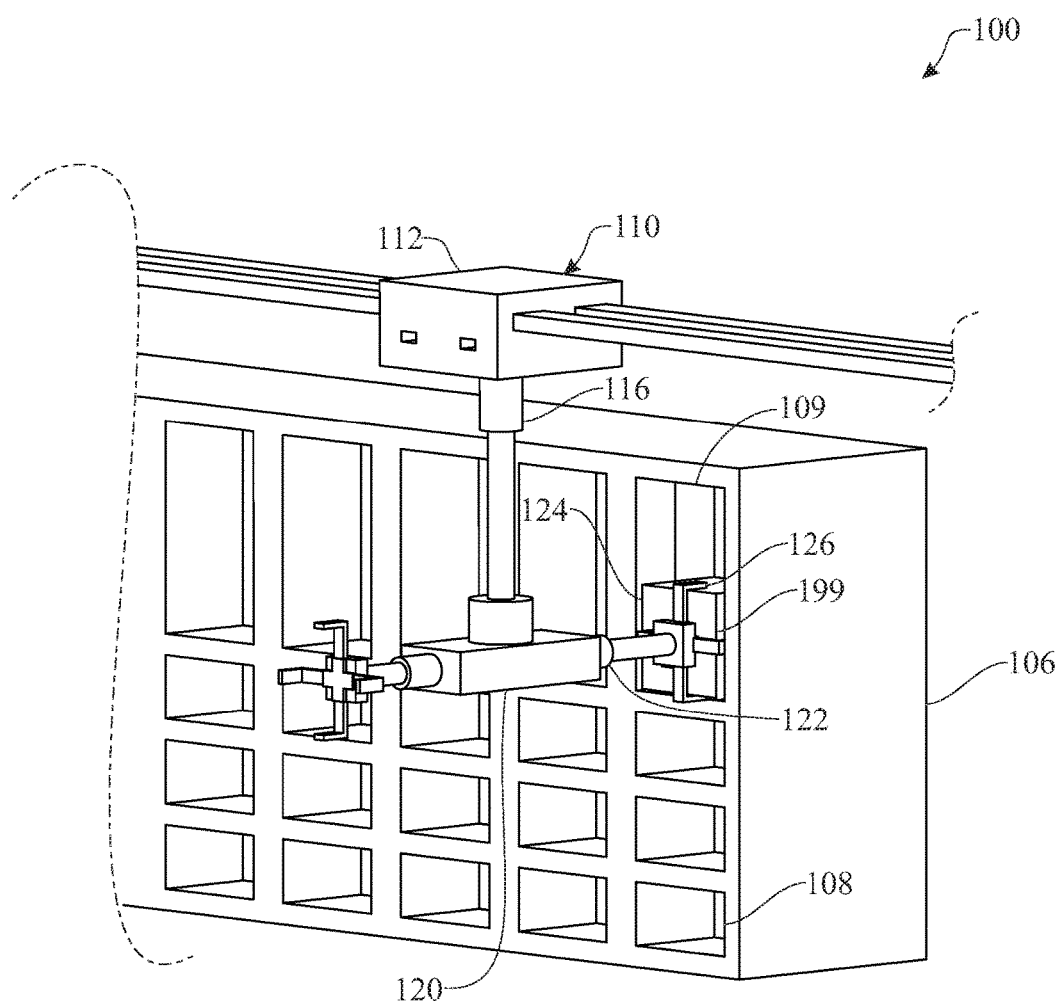
FIG. 8 presents an isometric view of the robotic module having its utility head vertically aligned with the parcel to be retrieved.
Figure 9:
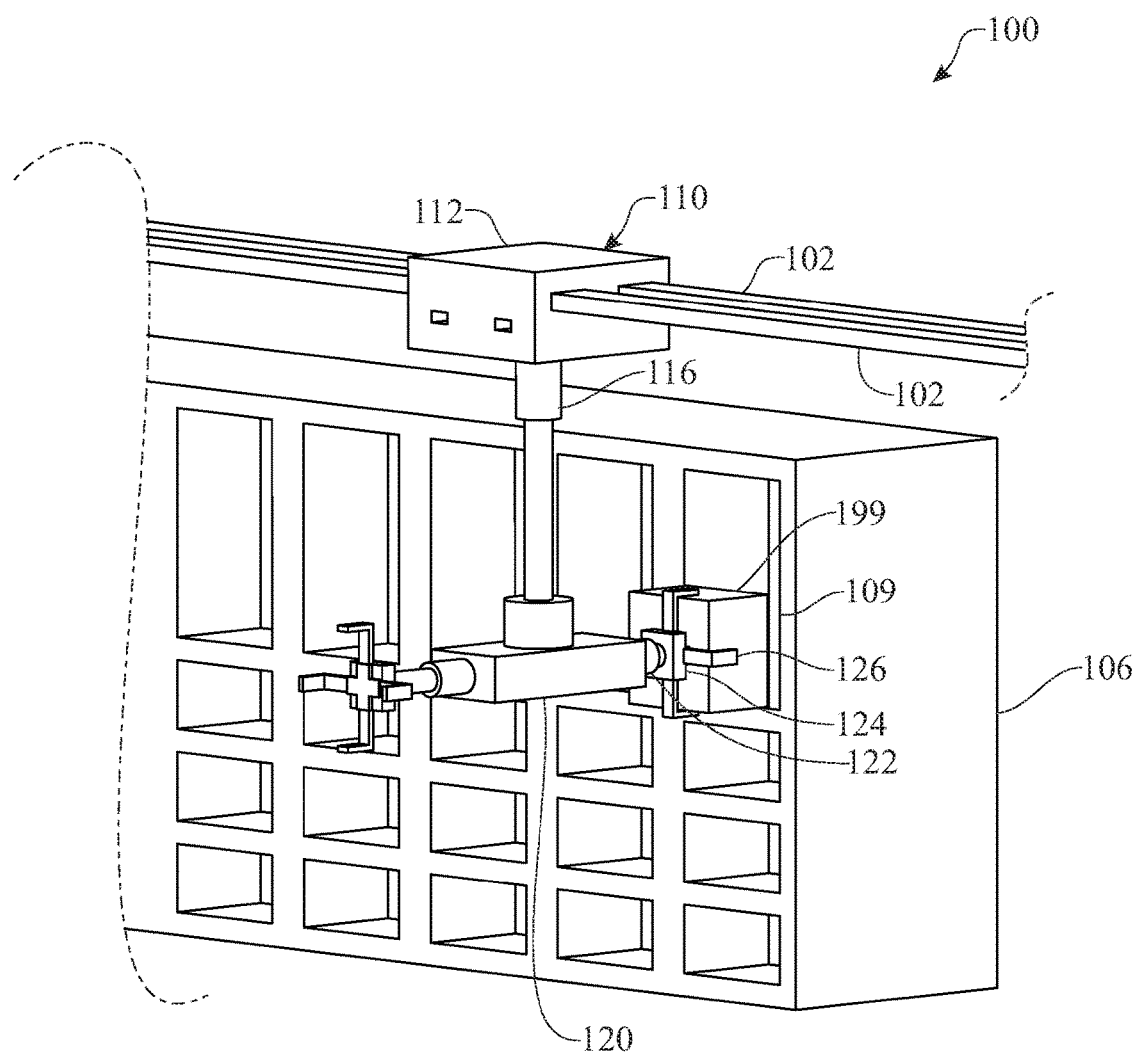
FIG. 9 presents an isometric view of the robotic module, wherein a plurality of fingers of a gripper head on the utility head are shown having engaged and partially extracted the parcel from the storage rack cell.
Figure 10:
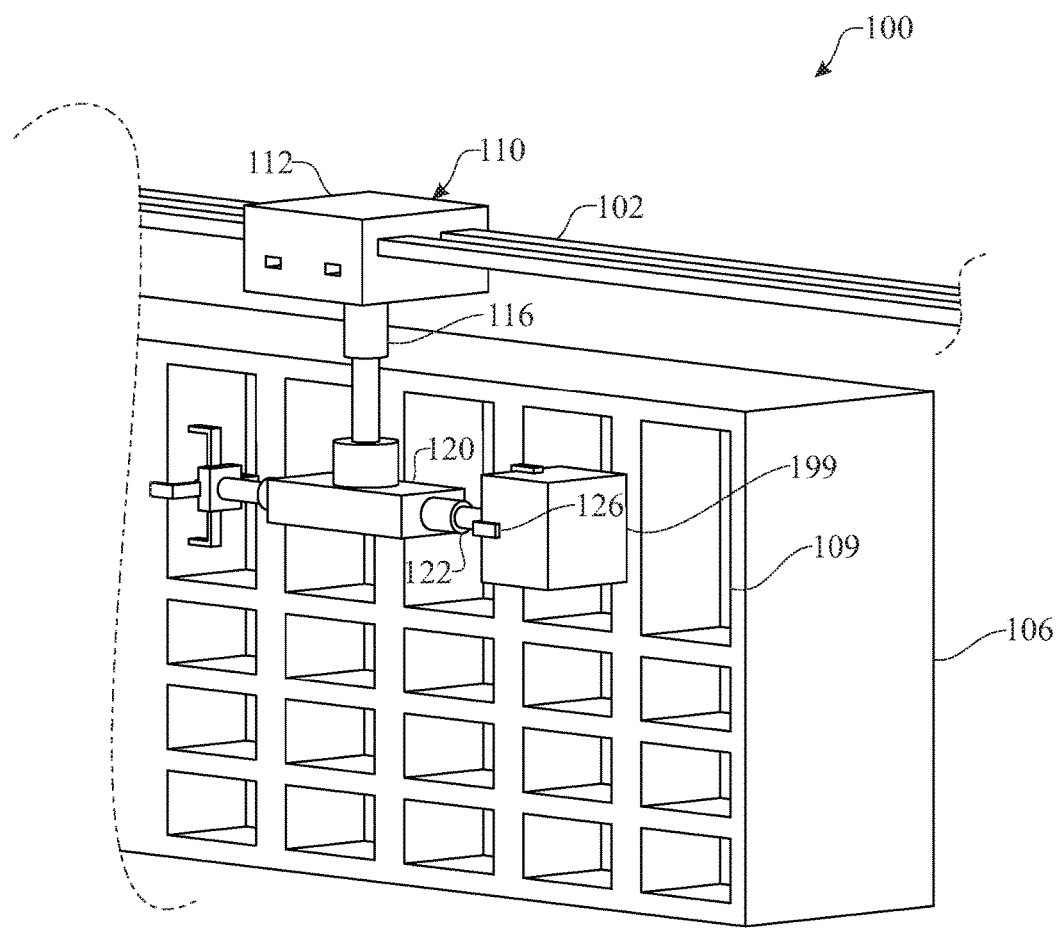
FIG. 10 presents an isometric view the robotic module wherein the utility head has rotated 90 degrees in preparation for translation along the tramway.
Figure 11:
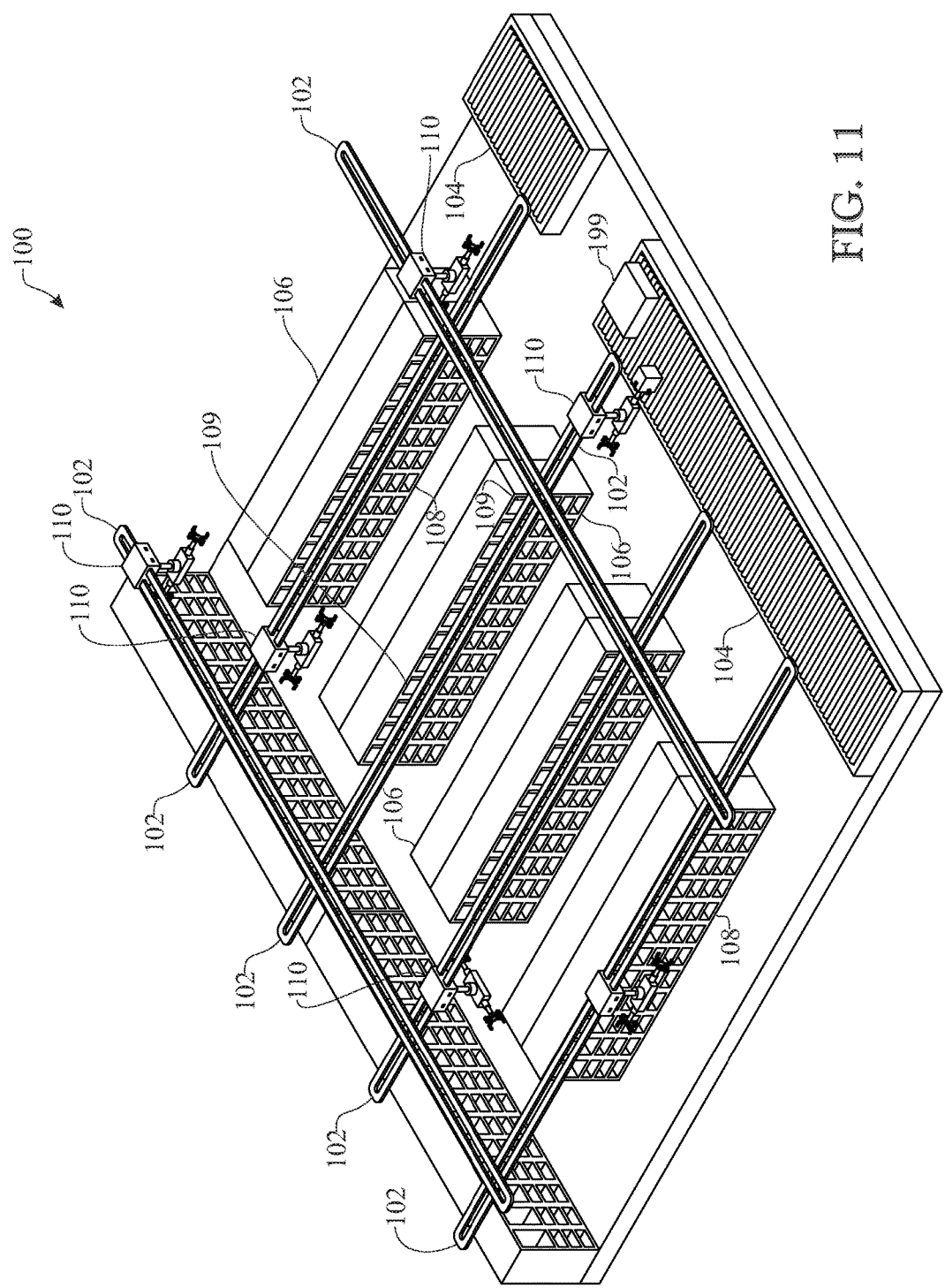
FIG. 11 presents an isometric overhead view of the warehousing system, illustrating the robotic module placing the retrieved parcel on a conveyor.

Referring now primarily to FIGS. 6-12, during operation, when a designated parcel 199 is desired to be retrieved from the plurality of storage racks 106, a user designates a particular parcel 199 to be retrieved by interfacing with the communication subsystem 160 utilizing the user input device 166 and display 164. The user queries the communication subsystem 164 the location of the desired parcel 199. The CPU 161 executes the warehousing instruction set stored on memory module 162 and identifies, via the database thereon, the individual cell 109 in which the parcel 199 is located. The CPU 161 then transmits to the transmitter 168 a retrieval order, including the cell 109 location, to the robotic module 110 servicing the designated cell 109. The powered carrier 112 of the robotic module 110 receives the retrieve signal, via the antenna 130 or the hardwire connection 172, and translates along the tramway 102 (FIG. 6). When the encoding sensor encounters the designated indexing point 136 along the tramway 102, the robotic module 110 stops in front of the designated cell 109 in which the parcel 199 to be retrieved is located (FIG. 7). The vertical control actuator 116 is then extended to position the parcel carrier 120 substantially in a horizontal alignment with the parcel 199. The gripper head 124 expands the gripper fingers 126 to enable capture of the parcel 199 therein, and the horizontal control actuator 122 is extended toward the parcel 199 until the gripper fingers 126 engage the parcel 199. The gripper fingers 126 are then retracted to frictionally secure the parcel 199 within the grasp of the plurality of gripper fingers 126 (FIG. 8). Once the parcel 199 has been securely grasped by the gripping fingers 126, the horizontal control actuator 122 is retracted to extract the parcel 199 from the designated cell 109 of the storage rack 106. (FIG. 9). The parcel carrier can then be rotated 90 degrees about the vertical axis 150 to align the parcel carrier in preparation for translation of the robotic module 110 along the tramway 102 (FIG. 10). The robotic module 110 then translates along the tramway 102 to its designated destination, such as conveyor 104. The vertical control actuator 116, the horizontal control actuator 122, and the gripper fingers 126 as controlled by the gripper head 124, are then manipulated to place the parcel 199 on the conveyor 104 (FIG. 11). The robotic module 110 is then free to be re-tasked by the communication subsystem 160 for the placement or retrieval of a new parcel.

Referring now to FIGS. 13-20, an exemplary implementation of an alternative overhead warehousing system 200 is shown which incorporates a plurality of drones 202 that now perform a portion of the operations previously performed by the overhead tramways 102 and the robotic modules 110. The system 200 has a plurality of flight corridors 203 defined along the storage racks 106 adjacent to the plurality of individual cells 108, 109. The overhead tramways 102 and robotic modules 110 of the system 100 are still employed in the alternative system 200 but are not shown in FIGS. 13-20 for purposes of clarity. The overhead tramways 102 and the flight corridors 203 extend adjacent to one another along the individual cells 108, 109 of the storage racks 106.

Figure 13:
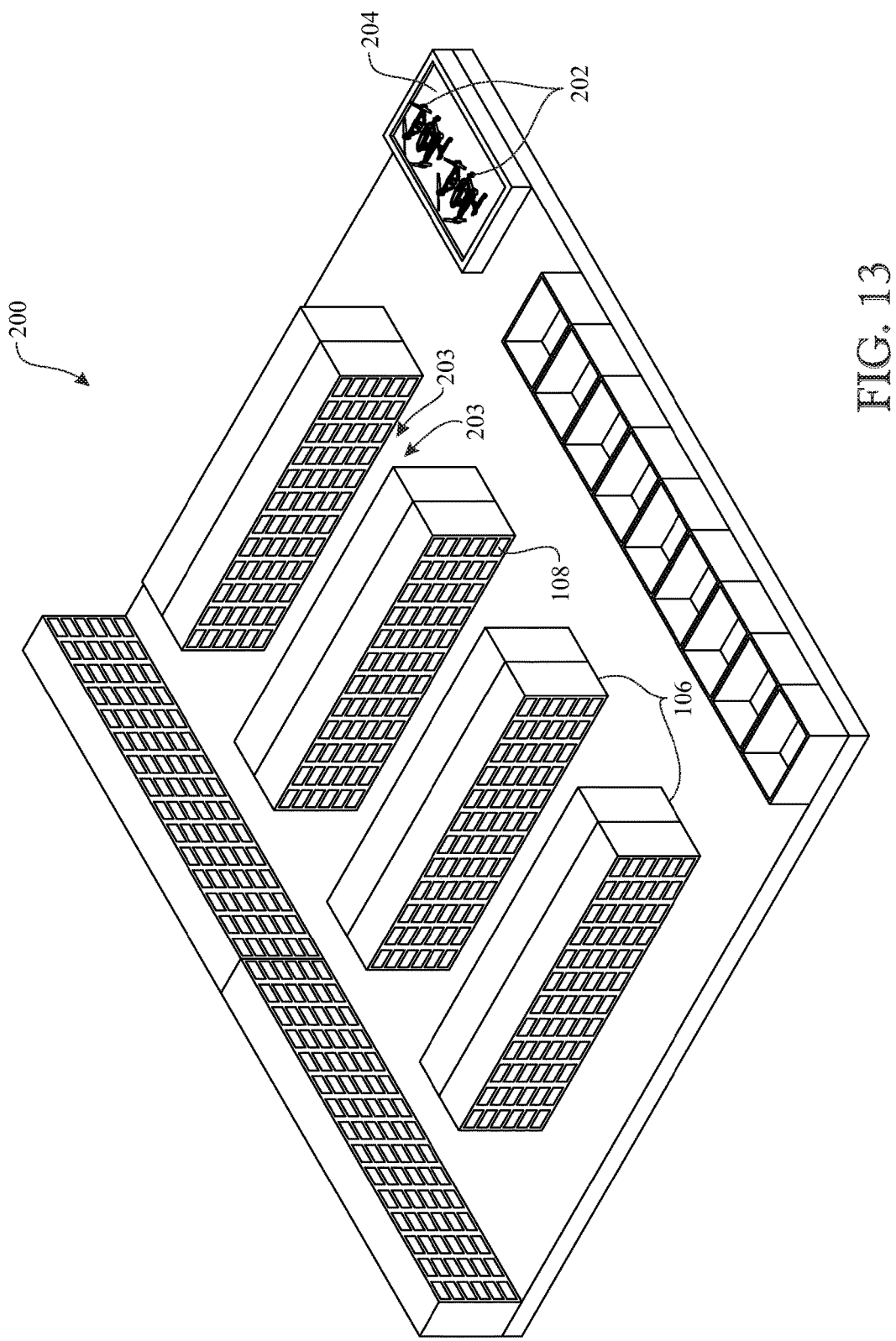
FIG. 13 presents an isometric view of alternative overhead warehousing system in accordance with an exemplary implementation, wherein a plurality of drones now incorporated by the alternative system are shown located at a docking station but overhead tramways and robotic modules of the system are not shown.

In FIG. 13, the drones 202 are shown located at a designated charging/docking station 204. A drone 202 would be selected and assigned by the communications subsystem 160 to retrieve a parcel 199 from a drawer 205 (see FIGS. 14-16) at a designated retrieval location of the one cell 108, 109. As stated earlier, each cell, or bin, 108, 109 can be readily identified by unique physical coordinates. Thus, each drawer 205, configured to contain a parcel 199, is positioned at a designated parcel retrieval location of one of the individual cells 108, 109 in the storage racks 106. Also, each drawer 205 is adapted to be opened and closed relative to the one individual cell. The communication subsystem 160, in communication with each of the drones 202, plots a retrieval flight trajectory 206 (that does not interfere with other drones and is the most direct route) for the selected drone 202 to fly from the designated docking station 204 to the designated retrieval cell location 109. The communication subsystem 160 also is in communication with the robotic modules 110 and individual cells 109 for opening and closing the one of the drawers 205 of a selected one of the individual cells as the drone approaches and departs from the selected one individual cell. In preparation for the drone's arrival, the drawer 205 at the cell is opened using the robotic module 110 (or another electro-mechanical mechanism associated with the drawer) controlled by the communication subsystem 160 in the manner as described earlier.

Figure 14:
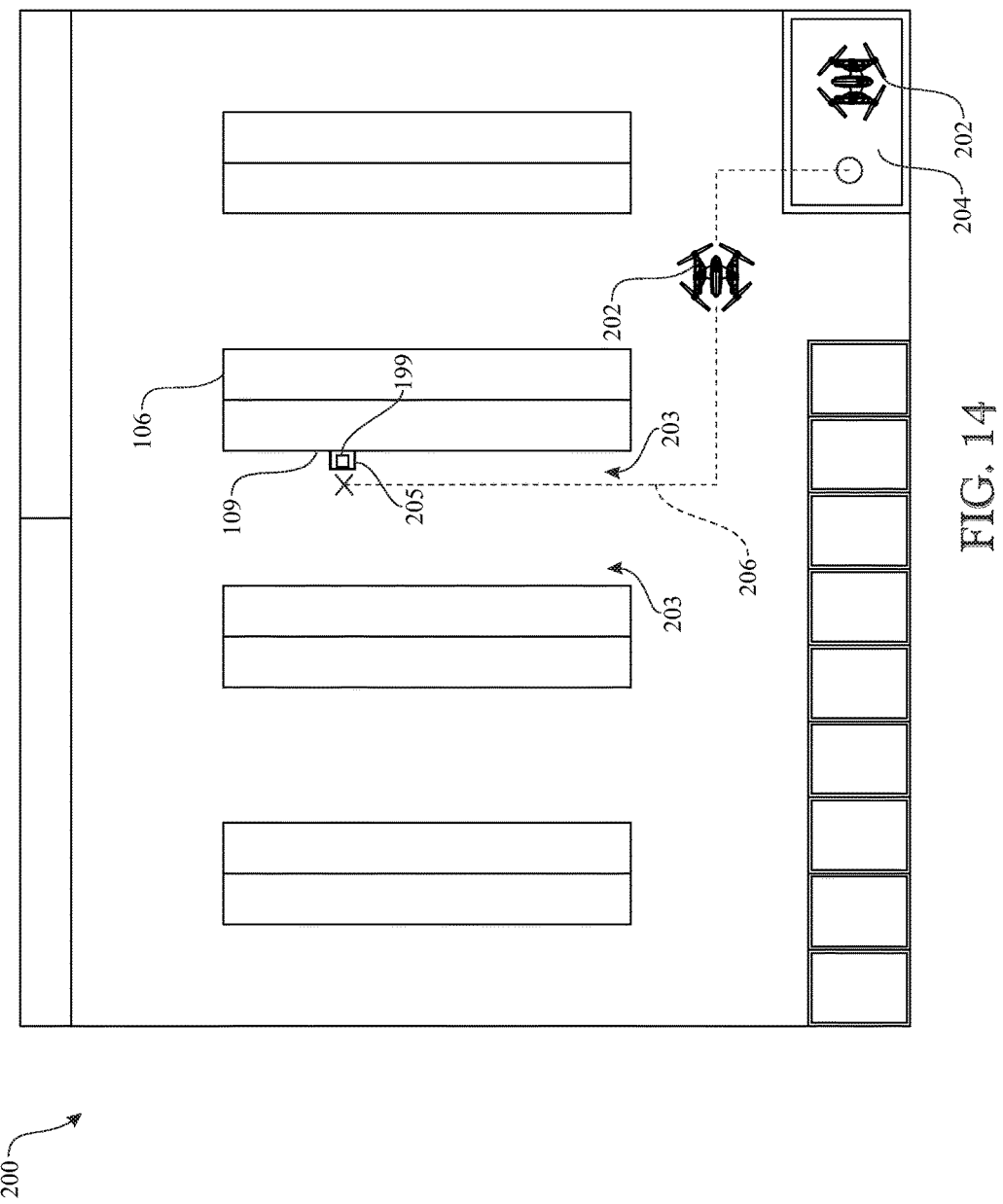
FIG. 14 presents a top plan view of the system of FIG. 13, wherein a drone is shown flying along a flight trajectory calculated as the most direct route from the drone docking station to a parcel stored at a designated retrieval location.
Figure 15:
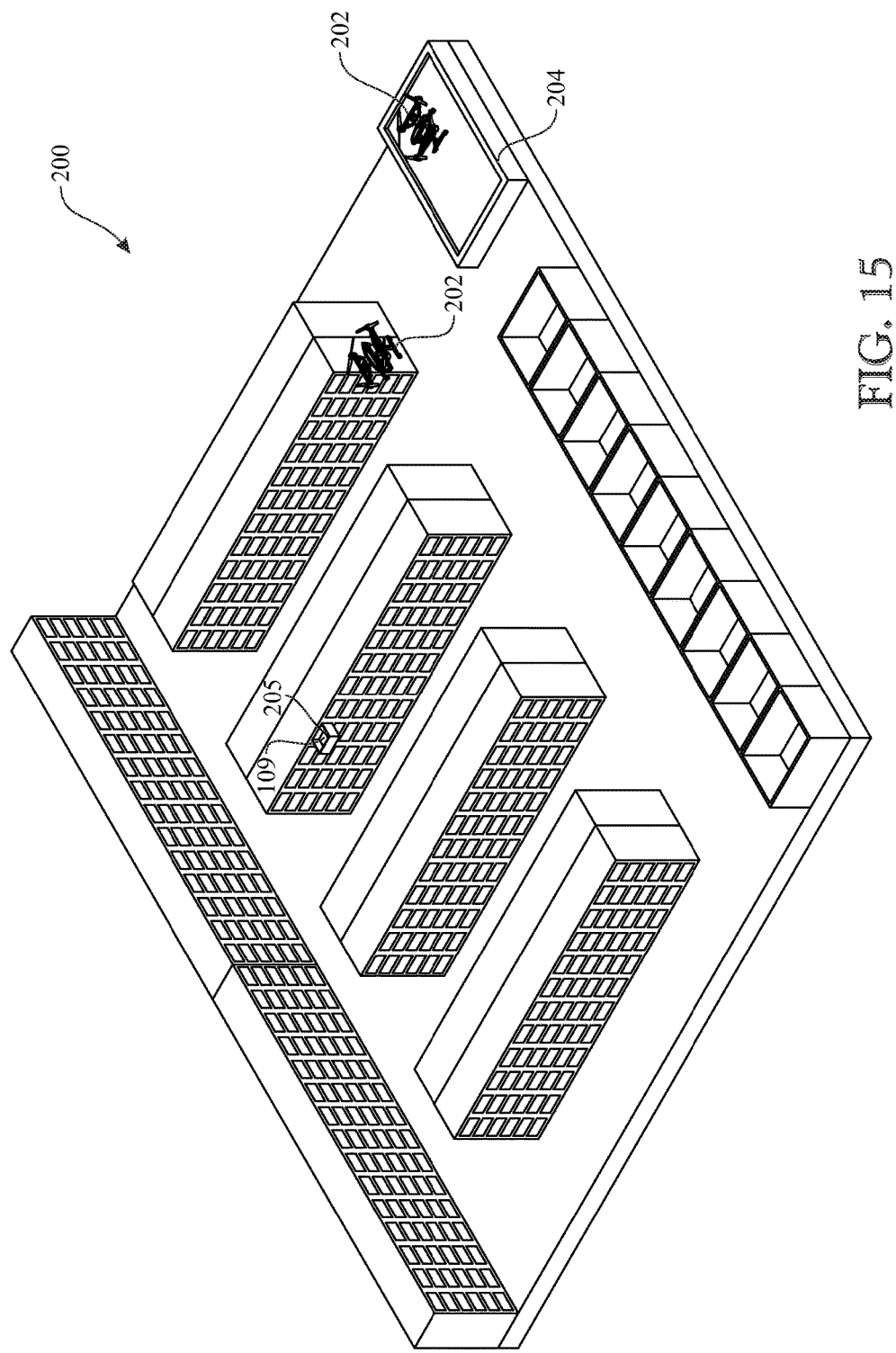
FIG. 15 presents an isometric view of the system of FIG. 13, wherein the drone is shown flying along the trajectory shown in FIG. 14.
Figure 16:
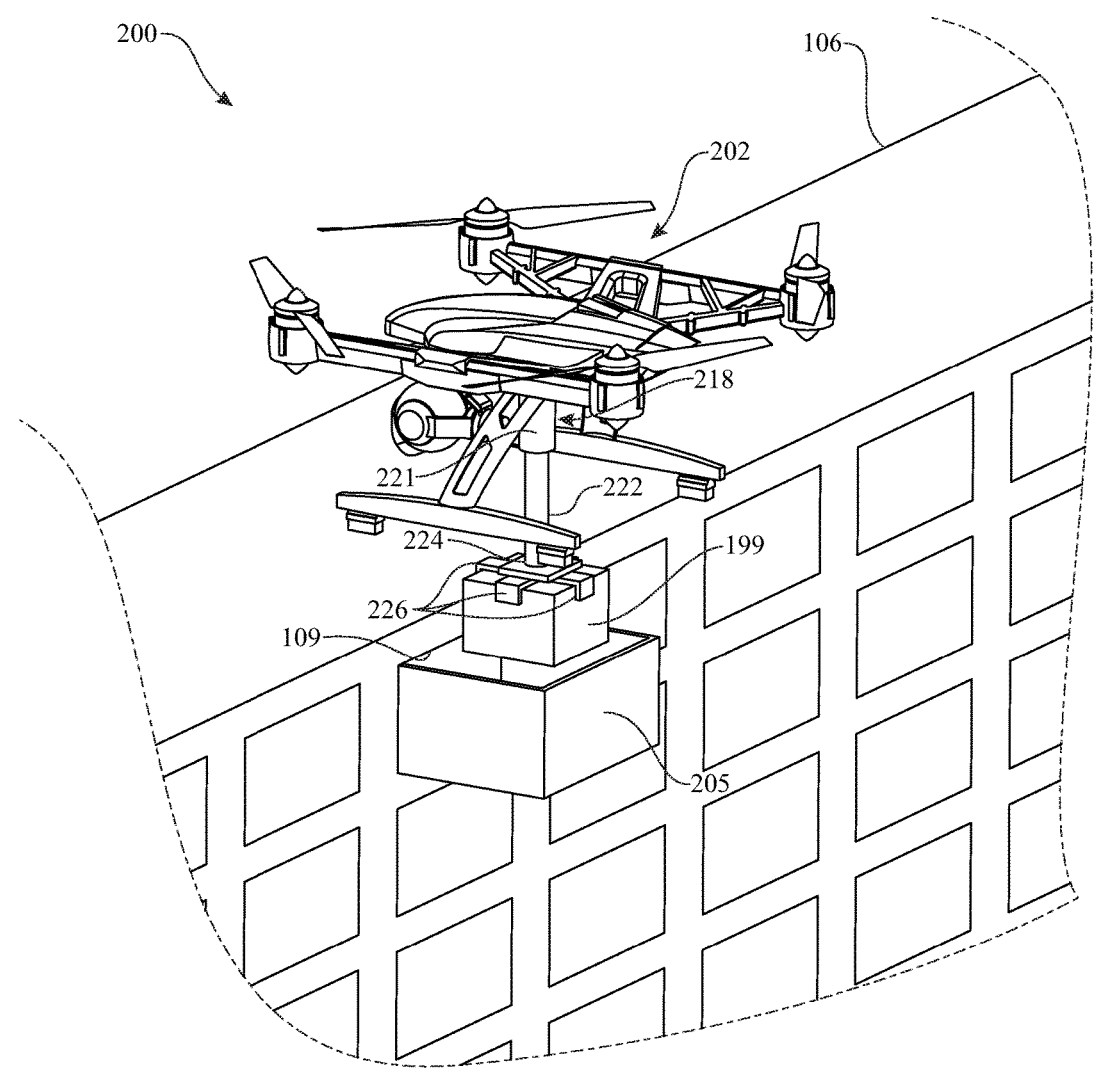
FIG. 16 presents an isometric view of the drone at the designated retrieval location in the process of retrieving the parcel.
Figure 17:
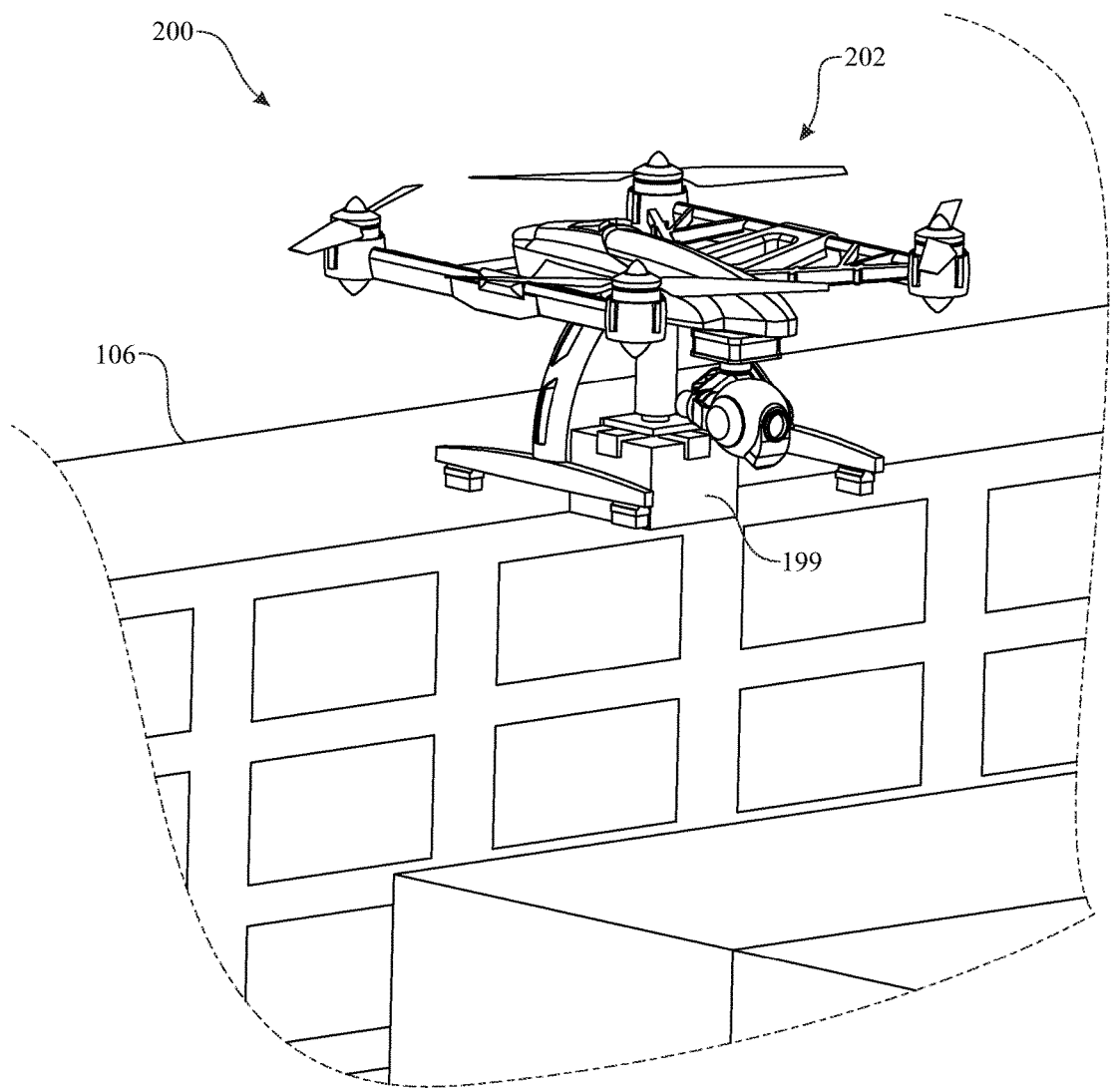
FIG. 17 presents an isometric view of the drone at the designated retrieval location after completing retrieval of the parcel.

FIGS. 14-15 show the selected drone 202 flying along the flight retrieval trajectory 206 from the drone docking station 204 to a designated retrieval cell location 109 in one of the racks 106 where the parcel 199 to be retrieved is located in the opened drawer 205. FIGS. 16-17 show the drone 202 at the designated retrieval location 109 in the process of completing retrieval of the parcel 199 from the opened drawer 205. The drone 202 has a utility head 218 (including a gripper control 221 with a gripper actuator 222) operatively mounted to the drone and a gripper head 224 mounted to the utility head (via the gripper actuator) and having a plurality of gripper fingers 226 being selectively positionable relative to the gripper head 224. The gripper fingers 226 are extendible to an open position to receive the parcel 199 therein and then retractible to frictionally grasp the parcel 199, similar to the operations performed by the robotic module 110 as described earlier. The gripper head 224 thus grasps the parcel from the drawer 205 and the drone 202 starts flying away from the retrieval cell location 109. The bin/shelf is closed by operations performed by the robotic module 110 (or another electro-mechanical mechanism).

Figure 18:
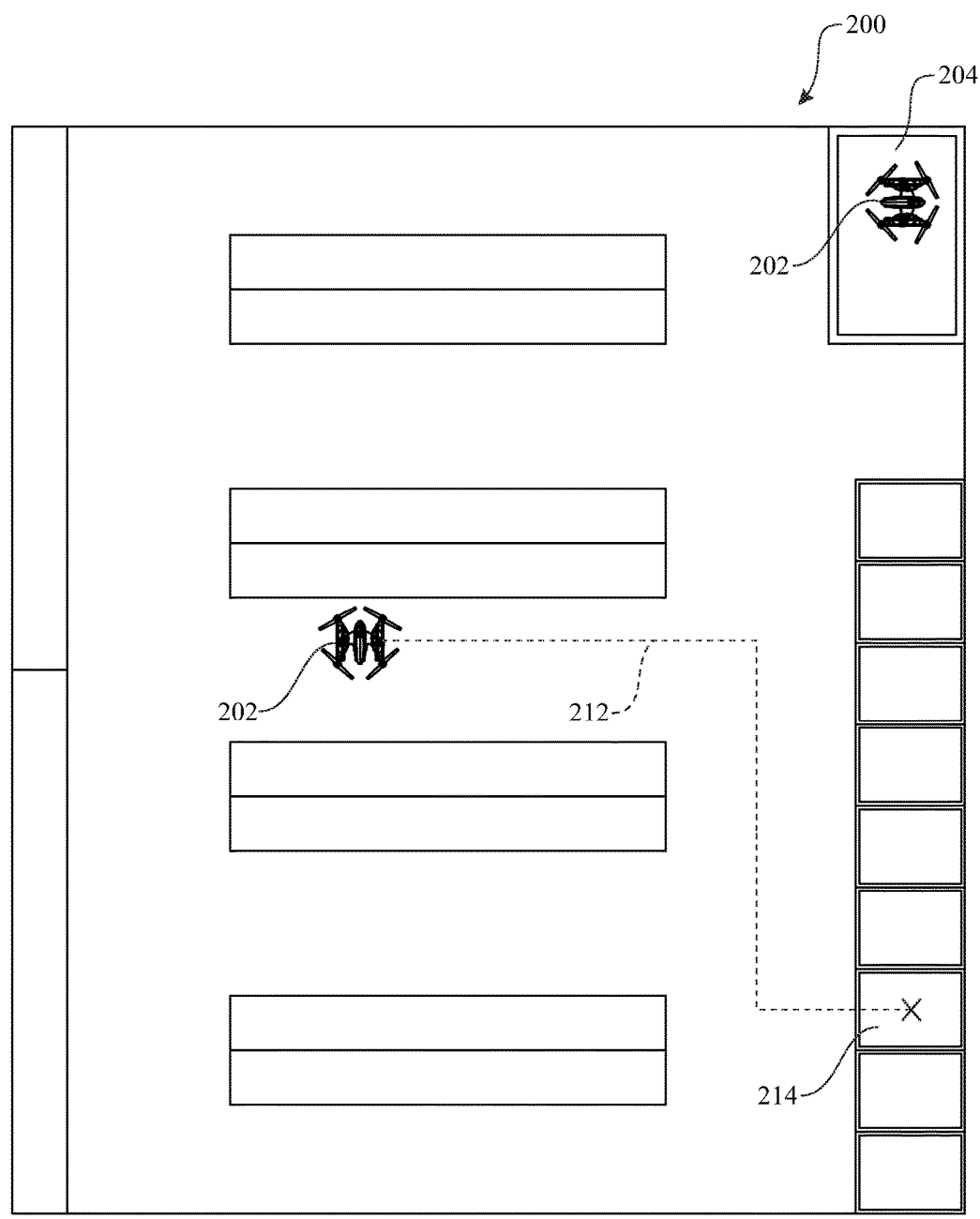
FIG. 18 presents a top plan view of the system as shown in FIG. 14, wherein now the drone is shown flying along a flight trajectory calculated as the most direct route from the designated retrieval location to a designated drop location.
Figure 19:
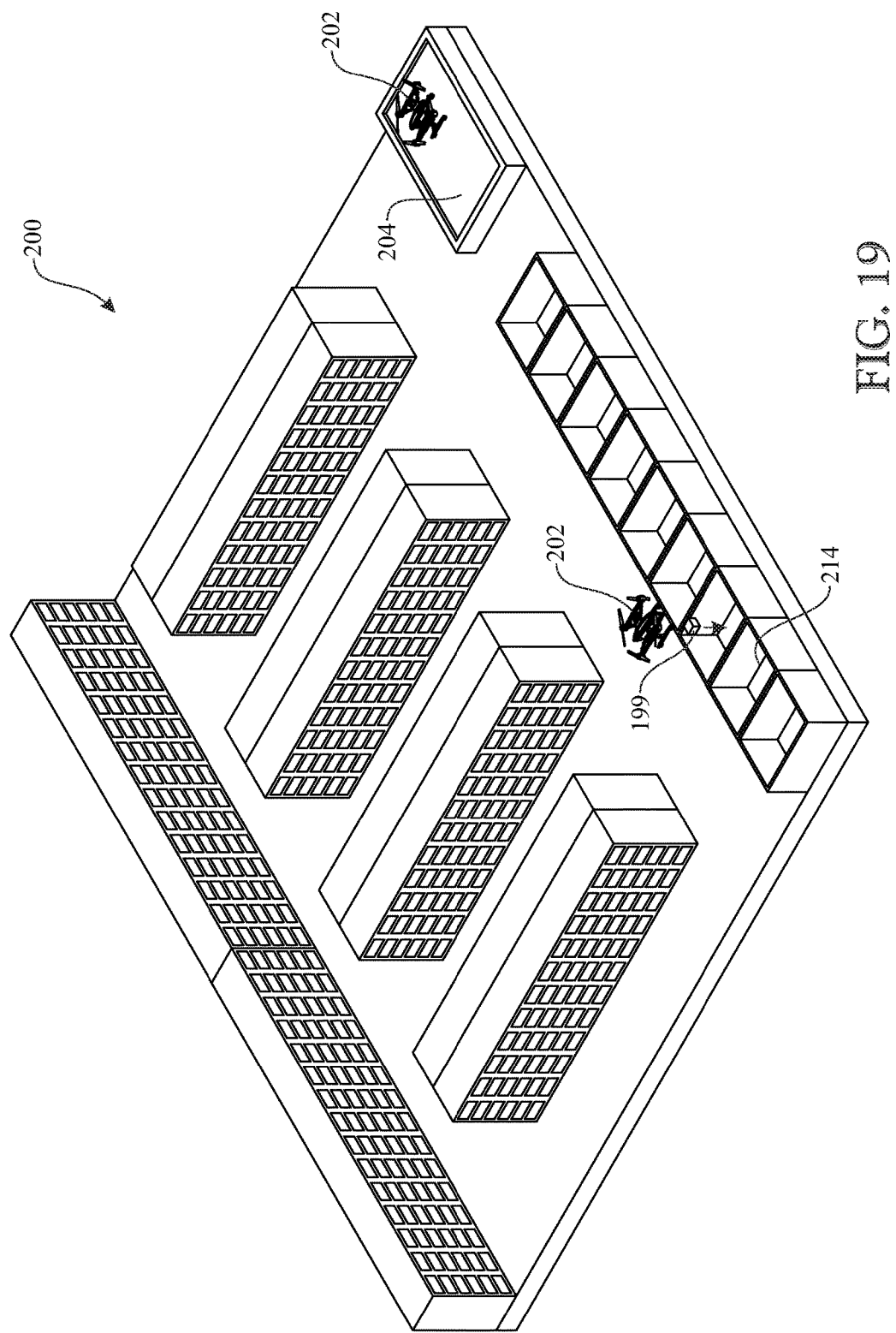
FIG. 19 presents an isometric view of the drone at the designated drop location in the process of dropping the product.

Concurrently, with the plotting of the flight retrieval trajectory 206 from the drone docking station 204 to a designated retrieval cell location 109, the communication subsystem 160 also plotted a flight delivery trajectory 212 from the designated retrieval cell location to a designated drop location 214 and a flight return trajectory 216 from the designated drop location 214 to the drone docking station 204. FIGS. 18-19 show the drone 202 flying along the flight delivery trajectory 212 calculated as the most direct route from the designated retrieval location to a designated drop location. Upon the drone 202 reaching the designated drop location, it drops the parcel at the designated drop location 214. Then, as seen in FIG. 20, the drone 202 flies along the return trajectory 216 and lands at its charging/docking station 204 where it awaits further instructions.

One of the drones (or alternatively one of the robotic modules 110) may be selected and assigned to re-stock another parcel at the designated receiving bin location of the cell 109 from which the parcel was just retrieved. The same process is carried out as described above but the drone instead picks up a parcel from a designated warehouse receiving location. The designated receiving bin location where the drone is to bring the parcel is opened in advance of the drone's arrival using an appropriate robotic module. The communication subsystem 160 plots the various flight trajectories (not to interfere with other drones and along most direct route) the drone is to follow respectively: a first flight trajectory to the designated warehouse receiving location, then a second flight trajectory to designated receiving bin location, and then a third flight trajectory back to the charging/docking station. After flying along the first flight trajectory and picking up the parcel at the designated warehouse receiving location, the drone flies along the second flight trajectory to, and deposits the parcel at, a known empty position in the bin/shelf at the designated receiving bin location. After the deposit, the drawer 205 of the bin/shelf is closed by the appropriate robotic module (or other electro-mechanical mechanism). The drone then returns along the third flight trajectory to the docking station to await further instructions or is redirected to pick another parcel for retrieval from the warehousing storage area.

To recap, autonomous and self-guided, self-taught drones may be used for efficient and quick picking and retrieving items, parcels or packages in the warehouse in conjunction of any type of sortation systems in order fulfilments, e-commerce and stock replenishment. Drones receive pick assignment from a Warehouse Management System (WMS) or Warehouse Control System (WCS) employed by the communication subsystem. Parcels are located in the drawers, which may be motor controlled. Each drawer has a predetermined matrix of items location. The WMS or WCS knows where each and every parcel is located. Drones fly in a predetermined, preassigned flight corridors. A central flight control system (CFCS) employed by the communication subsystem monitors the location of each drone to prevent collisions between drones and conflicts between paths. When the drone approaches toward the assigned drawer, where the parcel to be picked is stored, the WMS or WCS instruct the drawer to fully retract open and the drone slows down to pick the item using the gripper. Upon picking the parcel, the drone flies on to a conveyor or a sorter and drops the parcel there. The conveyor may convey the parcel to the appropriate packing station, one of many, categorized by package size, destination or any other possible category. The CFCS employed by the communications subsystem also monitors the life of the battery of the drone. For example, when the battery charge reaches 10% of its remaining life, the drone receives instruction to fly to a recharging station and lands there until fully recharged. Before going to recharge station, the drone sends a signal to the WMS that it will not fulfill its current assignment. The WMS releases the assignment and sends it to another drone in the space.

The number of drones flying simultaneously is determined by the capabilities of CFCS. Parcel replenishments into the drawers may be performed over night or when the warehouse is not in operation and by using the robotic modules or drones.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An overhead warehousing system for use in a warehouse having a ceiling and a plurality of storage racks supported by a floor of said warehouse, said overhead warehousing system comprising:
a plurality of drawers each configured to contain a parcel, said each drawer being positioned at a designated parcel retrieval location of one of a plurality of individual cells in each of said plurality of storage racks and adapted to be opened and closed relative to said one individual cell;
a plurality of flight corridors defined along said storage racks adjacent to said plurality of individual cells;
at least one drone having a gripper head translatable relative to an opened one of said drawers at said designated parcel retrieval location of said respective one individual cell for retrieving a parcel from said opened one of said drawers; and
a communication subsystem in communication with said at least one drone for plotting a flight trajectory for said at least one drone and controlling flying of said drone on said flight trajectory along at least one of said flight corridors and between a designated docking station, a selected one of designated parcel retrieval locations and a selected one of designated parcel drop locations, said communication subsystem also in communication with said at least one drone for controlling translation of said gripper head relative to said opened one of said drawers and with said individual cells for opening and closing said drawer of a selected one of said individual cells as said at least one drone approaches and departs said selected one individual cell.

2. The system as recited in claim 1 wherein said gripper head of said drone has a plurality of gripper fingers operable to undergo vertical translation and angular rotation for retrieving the parcel from said opened one of said drawers by respectively grasping and removing the parcel from said opened drawer.

3. The system as recited in claim 2 wherein said communication subsystem is also in communication with said at least one drone for controlling operation of said gripper fingers of said gripper head to respectively drop the parcel at a selected one of said designated parcel drop locations.

4. The system as recited in claim 1 wherein said communication subsystem is also in communication with said at least one drone for monitoring a battery of said drone and instructing said drone to fly to a recharging station when said battery reaches a predetermined percentage of remaining life of said battery.

5. The system as recited in claim 1 further comprising a plurality of tramways affixed to said ceiling of said warehouse and extending adjacent to said plurality of flight corridors and along said plurality of individual cells of each of said plurality of storage racks.

6. The system as recited in claim 5 further comprising at least one robotic module engaged upon and movable along each of said tramways between said designated parcel retrieval locations of respective ones of said individual cells of each of said storage racks.

7. The system as recited in claim 6 wherein said at least one robotic module has a gripper head translatable relative to an opened one of said drawers at said designated parcel retrieval location of said respective one individual cell for depositing a parcel into said opened drawer to restock said one individual cell with a parcel.

8. The system as recited in claim 7 wherein said communication subsystem is also in communication with said at least one robotic module for controlling movement thereof along a selected one of said tramways between a selected one of designated parcel retrieval locations and translation and angular rotation of said gripper head.

9. An overhead warehousing system for use in a warehouse having a ceiling and a plurality of storage racks supported by a floor of a warehouse, said overhead warehousing system comprising:
a plurality of drawers each configured to contain a parcel, said each drawer being positioned at a designated parcel retrieval location of one of a plurality of individual cells in each of said plurality of storage racks and adapted to be opened and closed relative to said one individual cell;
a plurality of flight corridors defined along the storage racks adjacent to said plurality of individual cells;
a plurality of drones each having a gripper head translatable relative to an opened one of said drawers at said designated parcel retrieval location of said respective one individual cell for retrieving a parcel from said opened one of said drawers; and
a communication subsystem in communication with said drones for plotting flight trajectories for said drones and controlling flying of said drones on said flight trajectories along said flight corridors so as to monitor locations of each of said drones to prevent collisions between said drones as they fly from and to a designated docking station and selected ones of designated parcel retrieval locations and selected ones of designated parcel drop locations, said communication subsystem also in communication with said drones for controlling translation of said gripper heads relative to said opened ones of said drawers and further in communication with said individual cells for opening and closing said drawers of selected ones of said individual cells as said drones approach and depart said selected ones of individual cells.

10. The system as recited in claim 9 wherein each of said gripper heads of said drones has a plurality of gripper fingers operable to undergo vertical translation and angular rotation for retrieving the parcel from said opened one of said drawers by respectively grasping and removing the parcel from said opened drawer.

11. The system as recited in claim 10 wherein said communication subsystem is also in communication with said drones for controlling operation of said gripper fingers of said gripper heads of said drones to respectively drop parcels at selected ones of said designated parcel drop locations.

12. The system as recited in claim 9 wherein said communication subsystem is also in communication with said drones for monitoring a battery of each of said drones and instructing said each drone to fly to a recharging station when said battery reaches a predetermined percentage of the remaining life of said battery.

13. The system as recited in claim 9 further comprising a plurality of tramways affixed to the ceiling of the warehouse and extending adjacent to said plurality of flight corridors and along said plurality of individual cells of each of said plurality of storage racks.

14. The system as recited in claim 13 further comprising at least one robotic module engaged upon and movable along each of said tramways between known parcel deposit and retrieval locations of respective ones of said individual cells of each of said storage racks.

15. The system as recited in claim 14 wherein said at least one robotic module has a gripper head translatable relative to an opened one of said drawers at said known parcel deposit and retrieval location of said respective one individual cell for depositing a parcel into said opened drawer to re-stock said ones of said individual cells with parcels.

16. The system as recited in claim 15 wherein said communication subsystem is also in communication with said at least one robotic module for controlling movement thereof along selected ones of said tramways between selected ones of designated parcel retrieval locations and translation and angular rotation of said gripper head.

17. An overhead warehousing method for use in a warehouse having a ceiling and a plurality of storage racks supported by a floor of the warehouse, said overhead warehousing method comprising the steps of:
providing a plurality of drawers each configured to contain a parcel, with each drawer being positioned at a designated parcel retrieval location of one of a plurality of individual cells in each of the plurality of storage racks and adapted to be opened and closed relative to the one individual cell;
providing a plurality of flight corridors defined along the storage racks adjacent to the plurality of individual cells;
providing a plurality of drones each having a gripper head translatable relative to an opened one of the drawers at the designated parcel retrieval location of the respective one of the individual cells for retrieving a parcel from the opened one of the drawers;
communicating with the drones to plot flight trajectories for the drones;
communicating with the drones to control flying of the drones on the flight trajectories along the flight corridors and from and to a designated docking station and selected ones of designated parcel retrieval locations and selected ones of designated parcel drop locations;
communicating with the drones to control translation of gripper heads relative to opened ones of the drawers; and
communicating with the individual cells to open and close drawers of selected ones of the individual cells as the drones approach and depart the selected ones of the individual cells.

18. The method as recited in claim 17 further comprising the step of communicating with the drones to monitor locations of each of the drones during flight to prevent collisions between the drones as they fly from and to a designated docking station and selected ones of designated parcel retrieval locations and selected ones of designated parcel drop locations.

19. The method as recited in claim 17 further comprising the step of communicating with the drones to control operation of a plurality of gripper fingers of said gripper head of each of said drones to undergo vertical translation and angular rotation for retrieving the parcel from an opened one of said drawers by respectively grasping and removing the parcel from said opened one of said drawers.

20. The method as recited in claim 17 further comprising the step of communicating with the drones for monitoring a battery of each of the drones and instructing each drone to fly to a recharging station when the battery reaches a predetermined percentage of the remaining life of the battery.

* * * * *